United States Patent
Abdelghaffar et al.

(10) Patent No.: US 12,273,881 B2
(45) Date of Patent: Apr. 8, 2025

(54) TRANSPORT BLOCK AND HYBRID AUTOMATIC REPEAT REQUEST ACKNOWLEDGMENT DESIGN FOR FULL DUPLEX USER EQUIPMENT

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Ahmed Attia Abotabl, San Diego, CA (US); Huilin Xu, Temecula, CA (US); Krishna Kiran Mukkavilli, San Diego, CA (US); Tingfang Ji, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 17/778,782

(22) PCT Filed: Dec. 23, 2020

(86) PCT No.: PCT/US2020/066943
§ 371 (c)(1),
(2) Date: May 20, 2022

(87) PCT Pub. No.: WO2021/133974
PCT Pub. Date: Jul. 1, 2021

(65) Prior Publication Data
US 2023/0354326 A1    Nov. 2, 2023

(30) Foreign Application Priority Data
Dec. 24, 2019 (GR) .............................. 20190100577

(51) Int. Cl.
*H04W 72/1273* (2023.01)
*H04B 7/06* (2006.01)
(Continued)

(52) U.S. Cl.
CPC ...... *H04W 72/1273* (2013.01); *H04B 7/0626* (2013.01); *H04L 5/0053* (2013.01);
(Continued)

(58) Field of Classification Search
CPC ........... H04W 72/1273; H04W 72/232; H04W 72/23; H04W 72/0446; H04B 7/0626; H04L 5/0053; H04L 5/14
See application file for complete search history.

(56) References Cited

U.S. PATENT DOCUMENTS 10,306,656 B2 *  5/2019  Zhu ..................... H04W 72/542
11,122,580 B2 *  9/2021  Xiong ............... H04W 72/0446
(Continued)

FOREIGN PATENT DOCUMENTS

WO    2018103741 A1    6/2018
WO    2018160694       9/2018

OTHER PUBLICATIONS

ERICSSON: "Feature Lead Summary #2 for Scheduling of Multiple DL/UL Transport Blocks for LTE-MTC", 3GPP Draft, 3GPP TSG RAN WG1 Meeting #98, R1-1909698, Feature Lead Summary 2 for Scheduling of Multiple DL-UL Transport Blocks for LTE-MTC, 3rd Generation Partnership Project (3GPP), Mobile Competence Centre, 650, Route Des Lucioles, vol. RAN WG1, No. Prague, Czech Republic, Aug. 26, 2019-Aug. 30, 2019, Sep. 3, 2019 (Sep. 3, 2019), XP051766292.
(Continued)

*Primary Examiner* — Chandrahas B Patel
(74) *Attorney, Agent, or Firm* — Patterson & Sheridan LLP

(57) ABSTRACT

Techniques and apparatus for determining a transport block (TB) configuration and hybrid automatic repeat request
(Continued)

(HARQ) acknowledgment (ACK)/negative acknowledgment (NACK) configuration for full duplex (FD) UE(s) are described. One technique involves receiving channel state information (CSI) report(s) from a UE operating in FD mode. At least one of a TB configuration or feedback type for a communication slot is determined based on the CSI report(s). The communication slot can include half duplex (HD) symbol(s) and FD symbol(s). An indication of at least one of the TB configuration or the feedback type is signaled to the UE. Another technique involves receiving, from a base station (BS), downlink data transmission(s) across a slot(s). A type of duplexing mode associated with each of the slot(s) is determined. The downlink data transmission(s) are acknowledged, based at least in part on the type of duplexing mode associated with each of the slot(s).

30 Claims, 20 Drawing Sheets

(51) Int. Cl.
| | | |
|---|---|---|
| *H04L 5/00* | (2006.01) | |
| *H04L 5/14* | (2006.01) | |
| *H04W 72/0446* | (2023.01) | |
| *H04W 72/23* | (2023.01) | |
| *H04W 72/232* | (2023.01) | |

(52) U.S. Cl.
CPC ............ *H04L 5/14* (2013.01); *H04W 72/0446* (2013.01); *H04W 72/23* (2023.01); *H04W 72/232* (2023.01)

(56) References Cited

U.S. PATENT DOCUMENTS

| | | | |
|---|---|---|---|
| 11,729,753 B2* | 8/2023 | Marinier | H04L 5/0092 370/329 |
| 2018/0254877 A1 | 9/2018 | Wang et al. | |
| 2022/0191906 A1* | 6/2022 | Sengupta | H04W 72/51 |

OTHER PUBLICATIONS

Intel Corporation: "On NR FDD", 3GPP Draft, 3GPP TSG RAN1 WG Meeting #90bis, R1-1717412 ON NR FDD, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), pp. 1-3, XP051340601.
International Search Report and Written Opinion—PCT/US2020/066943—ISA/EPO—May 19, 2021.
Partial International Search Report—PCT/US2020/066943—ISA/EPO—Mar. 26, 2021.

* cited by examiner

TRANSPORT BLOCK AND HYBRID AUTOMATIC REPEAT REQUEST ACKNOWLEDGMENT DESIGN FOR FULL DUPLEX USER EQUIPMENT

CROSS-REFERENCE TO RELATED APPLICATIONS

This application is a national stage application under 35 U.S.C. 371 of PCT/CN2020/066943 filed Dec. 23, 2020, which is hereby expressly incorporated by reference herein in its entirety as if fully set forth below and for all applicable purposes.

BACKGROUND

I. Field of the Disclosure

Aspects of the present disclosure relate to wireless communications, and more particularly, to techniques for design of a transport block (TB) and hybrid automatic repeat request (HARD) acknowledgment (ACK)/negative acknowledgment (NACK) for full duplex (FD) UE(s).

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication that may be performed by a user equipment (UE). The method generally includes receiving, from a base station (BS), a plurality of downlink data transmissions across one or more slots. The method also includes determining a type of duplexing mode associated with each of the one or more slots. The method further includes acknowledging the plurality of downlink data transmissions based at least in part on the type of duplexing mode associated with each of the one or more slots.

Certain aspects provide an apparatus for wireless communication. The apparatus generally includes at least one processor, a memory coupled to the at least one processor, and a receiver. The receiver is configured to receive, from a base station (BS), a plurality of downlink data transmissions across one or more slots. The at least one processor is configured to determine a type of duplexing mode associated with each of the one or more slots and acknowledge the plurality of downlink data transmissions based at least in part on the type of duplexing mode associated with each of the one or more slots.

Certain aspects provide an apparatus for wireless communication. The apparatus generally includes means for receiving, from a base station (BS), a plurality of downlink data transmissions across one or more slots. The apparatus also includes means for determining a type of duplexing mode associated with each of the one or more slots. The apparatus further includes means for acknowledging the plurality of downlink data transmissions based at least in part on the type of duplexing mode associated with each of the one or more slots.

Certain aspects provide a computer readable medium having computer executable code stored thereon for wireless communications by a user equipment (UE). The computer executable code generally includes code for receiving, from a base station (BS), a plurality of downlink data transmissions across one or more slots. The computer executable code also includes code for determining a type of duplexing mode associated with each of the one or more slots. The computer executable code further includes code for acknowledging the plurality of downlink data transmissions based at least in part on the type of duplexing mode associated with each of the one or more slots.

Certain aspects provide a method for wireless communication that may be performed by a network entity, such as a BS, gNB, etc. The method generally includes receiving a plurality of channel state information (CSI) reports from a user equipment (UE) operating in full duplex (FD) mode. The method also includes determining, based at least in part on the plurality of CSI reports, at least one of a transport block (TB) configuration or a feedback type for a communication slot comprising one or more half duplex (HD) symbols and one or more FD symbols. The method further includes signaling an indication of at least one of the TB configuration or the feedback type to the UE.

Certain aspects provide an apparatus for wireless communication. The apparatus generally includes at least one processor, a memory coupled to the at least one processor, and a transmitter. The receiver is configured to receive a plurality of channel state information (CSI) reports from a user equipment (UE) operating in full duplex (FD) mode. The at least one processor is configured to determine, based at least in part on the plurality of CSI reports, at least one of a transport block (TB) configuration or a feedback type for a communication slot comprising one or more half duplex (HD) symbols and one or more FD symbols. The transmitter is configured to signal an indication of at least one of the TB configuration or the feedback type to the UE.

Certain aspects provide an apparatus for wireless communication. The apparatus generally includes means for receiving a plurality of channel state information (CSI) reports from a user equipment (UE) operating in full duplex (FD) mode. The apparatus also includes means for determining, based at least in part on the CSI reports, at least one of a transport block (TB) configuration or a feedback type for a communication slot comprising one or more half duplex (HD) symbols and one or more FD symbols. The apparatus further includes means for signaling an indication of at least one of the TB configuration or the feedback type to the UE.

Certain aspects provide a computer readable medium having computer executable code stored thereon for wireless communications by a network entity. The computer executable code generally includes code for receiving a plurality of channel state information (CSI) reports from a user equipment (UE) operating in full duplex (FD) mode. The computer executable code also includes code for determining, based at least in part on the CSI reports, at least one of a transport block (TB) configuration or a feedback type for a communication slot comprising one or more half duplex (HD) symbols and one or more FD symbols. The computer executable code further includes code for signaling an indication of at least one of the TB configuration or the feedback type to the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
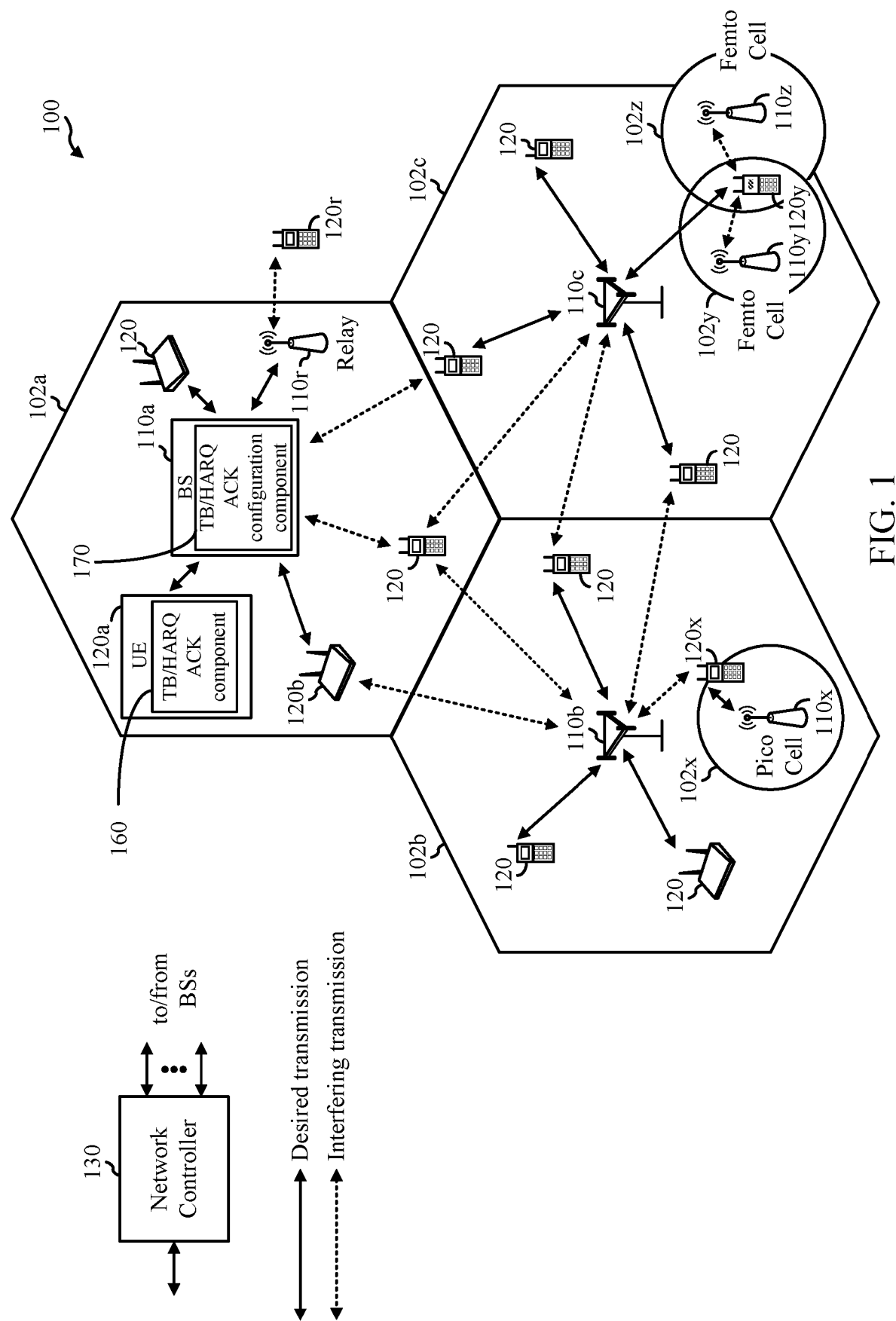
FIG. 1 is a block diagram conceptually illustrating an example telecommunications system, in accordance with certain aspects of the present disclosure.

Aspects of the present disclosure provide apparatus, methods, processing systems, and computer readable mediums for determining a transport block (TB) configuration and hybrid automatic repeat request (HARQ) acknowledgement (ACK) design (or configuration or protocol) for full duplex (FD) UEs.

For example, in communication systems that support FD operation, a FD UE may operate in a full duplex slot where the UE transmits uplink data and receives downlink data simultaneously. However, based on the actual UL and DL assignment, the simultaneous UL and DL operation may happened for a subset of the symbols within the slot and the UE may operate in half duplex (HD) for the remaining subset of symbols within the slot. In these cases, the quality of the DL reception in a given symbol may be impacted by the presence of an UL scheduling opportunity in the same symbol.

To address this, aspects provide techniques for determining a TB configuration and HARQ ACK design (or configuration or protocol) for FD UEs (e.g., to account for FD operation). In some aspects, a network entity, such as a BS, may determine at least one of a TB configuration or a feedback type for a communication slot that includes one or more HD symbols and one or more FD symbols, based on channel state information (CSI) report(s) received from a UE. The network entity may signal an indication of at least one of the TB configuration or the feedback type to the UE.

In some aspects, the UE may use the information of the TB configuration and the feedback type signaled from the network entity to acknowledge one or more downlink data transmissions from the network entity. For example, the UE may receive multiple downlink data transmissions from the network entity across multiple slots. The UE may determine a type of duplexing mode associated with each of the slots, and acknowledge the downlink data transmission(s) based at least in part on the type of duplexing mode associated with each of the slots.

The following description provides example techniques for determining a TB configuration and/or HARQ ACK design for HD and/or FD operation, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be a full-duplex NR system (e.g., a full-duplex 5G network). As shown in FIG. 1, the UE 120a has a TB/HARQ ACK component 160 which is configured to implement one or more techniques described herein. Similarly, as shown in FIG. 1, the BS 110a has a TB/HARQ ACK configuration component 170, which is configured to implement one or more techniques described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*a*, 120*b*, 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing (SCS). The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using time division duplexing (TDD). Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
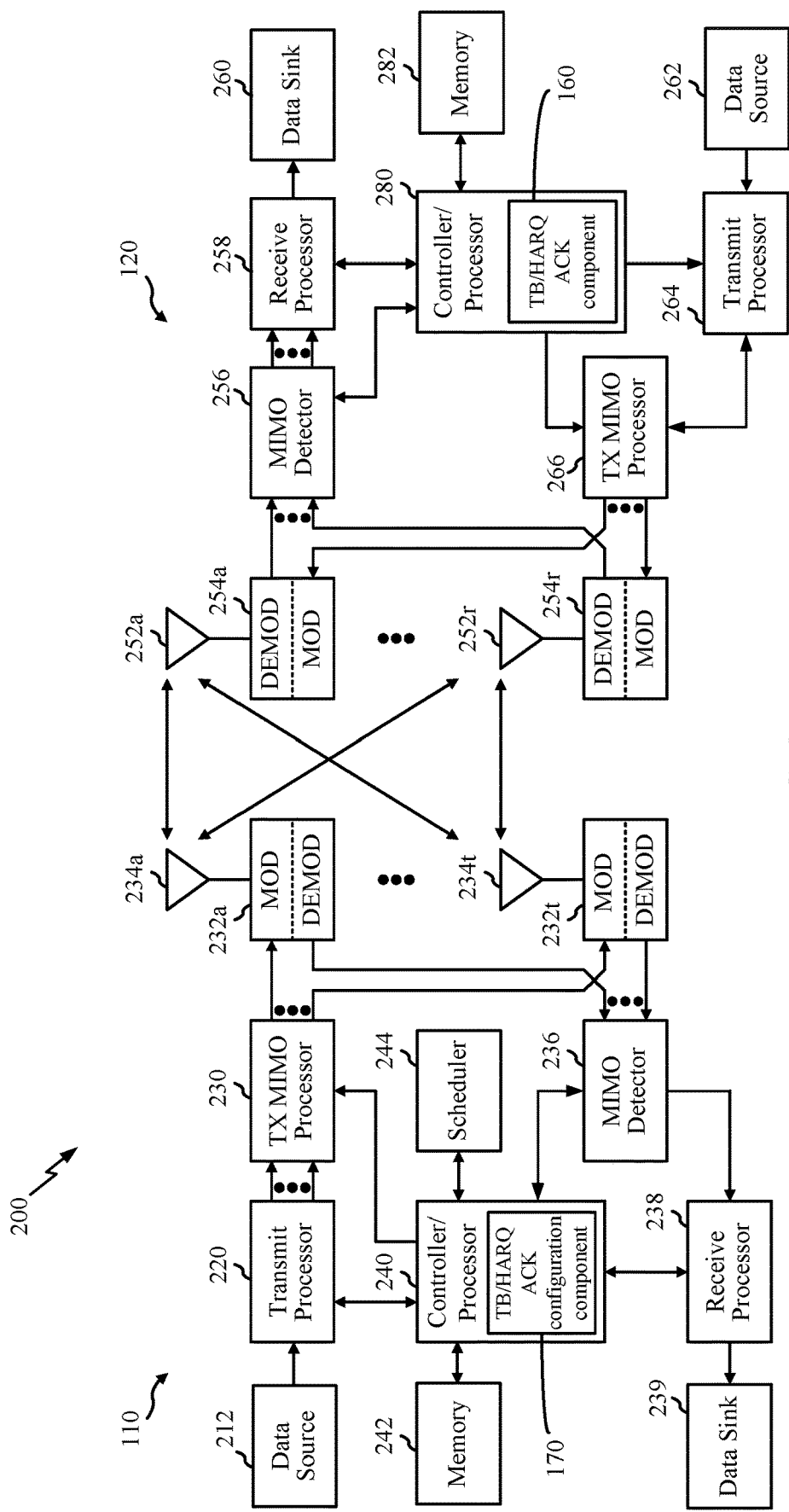
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a TB/HARQ ACK configuration component 170 that may be configured to perform the various techniques and methods described herein. As also shown in FIG. 2, the controller/processor 280 of the UE 120 has a TB/HARQ ACK component 160 that may be configured to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
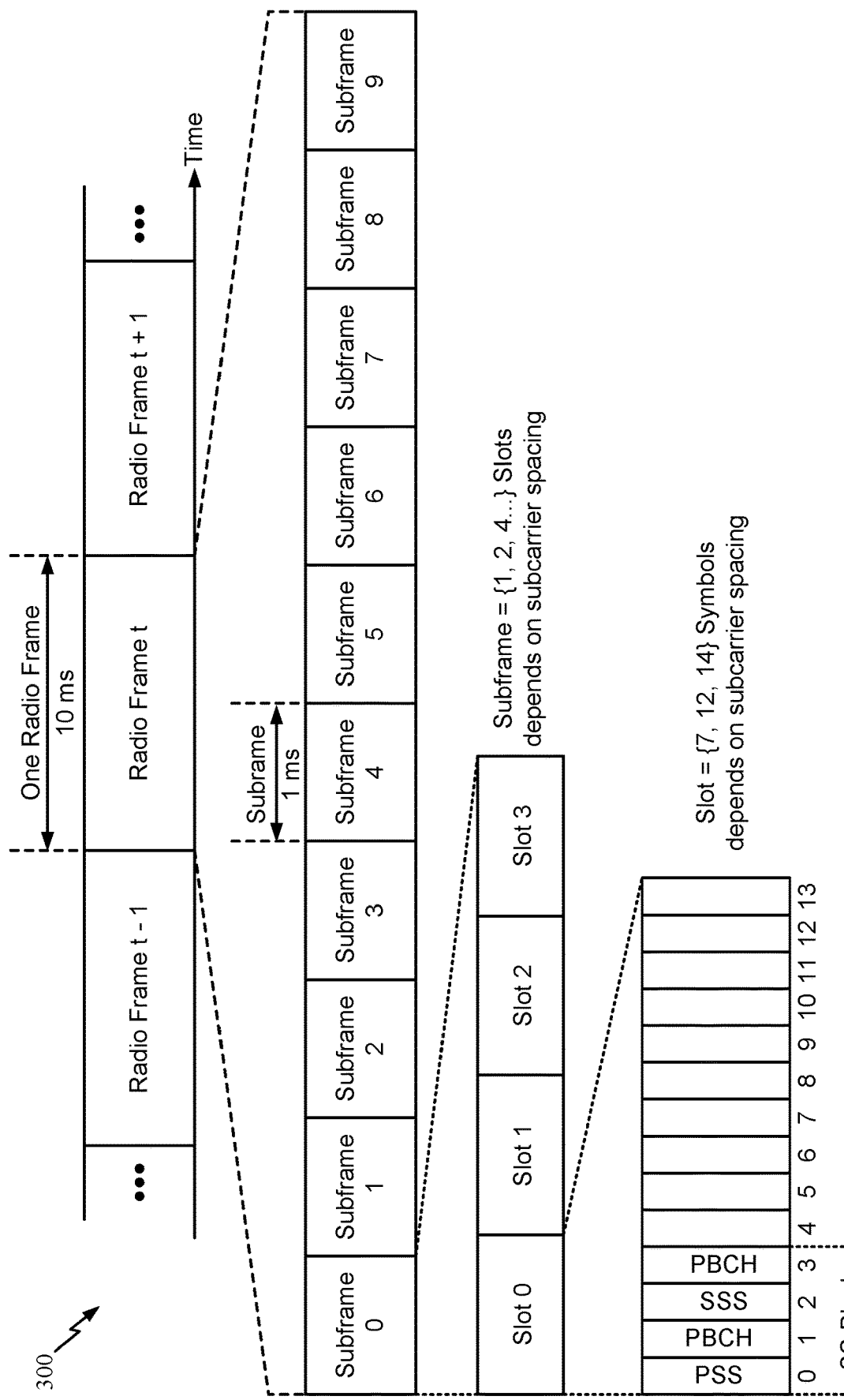
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Fifth generation (5G) wireless networks are expected to provide ultra-high data rates and support a wide scope of application scenarios. Wireless full-duplex (FD) communications is an emerging technique and is theoretically capable of doubling the link capacity when compared with half-duplex communications. The main idea of wireless full-duplex communications is to enable radio network nodes to transmit and receive simultaneously on the same frequency band in the same time slot. This contrasts with conventional half-duplex operation, where transmission and reception either differ in time or in frequency.

Figure 4A:
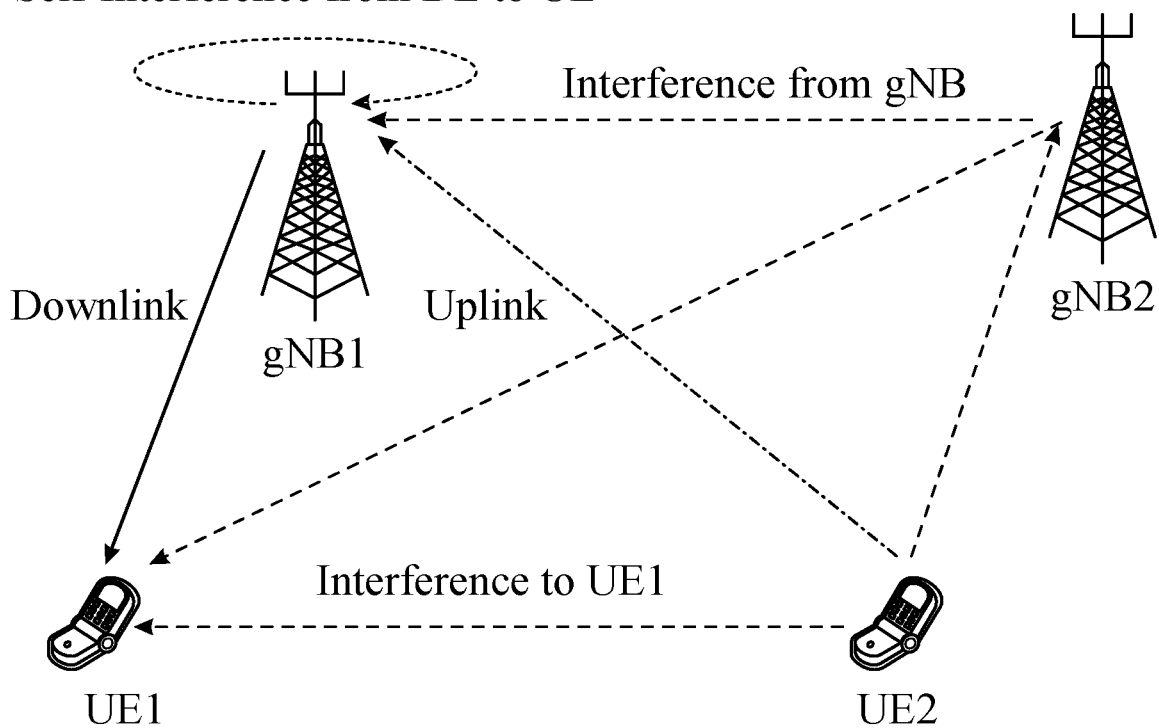
FIGS. 4A-4C illustrate different full duplex communication modes, in accordance with certain aspects of the present disclosure.

According to certain aspects, the wireless communication system may support various FD communication modes. FIG. 4A, for example, illustrates a FD communication mode with a FD BS (e.g., gNB1) and HD UE (e.g., UE1). In FIG. 4A, the FD BS can communicate simultaneously in UL and DL with two half-duplex terminals (i.e., UE1 and UE2) using the same radio resources. Here, the FD BS may be susceptible to self-interference from its downlink to uplink operation and interference from other gNBs (e.g., gNB2). Similarly, the HD UE (e.g., UE1) may be susceptible to interference from the other gNB(s) (e.g., gNB2) and interference from other UEs (e.g., UE2).

Figure 4B:
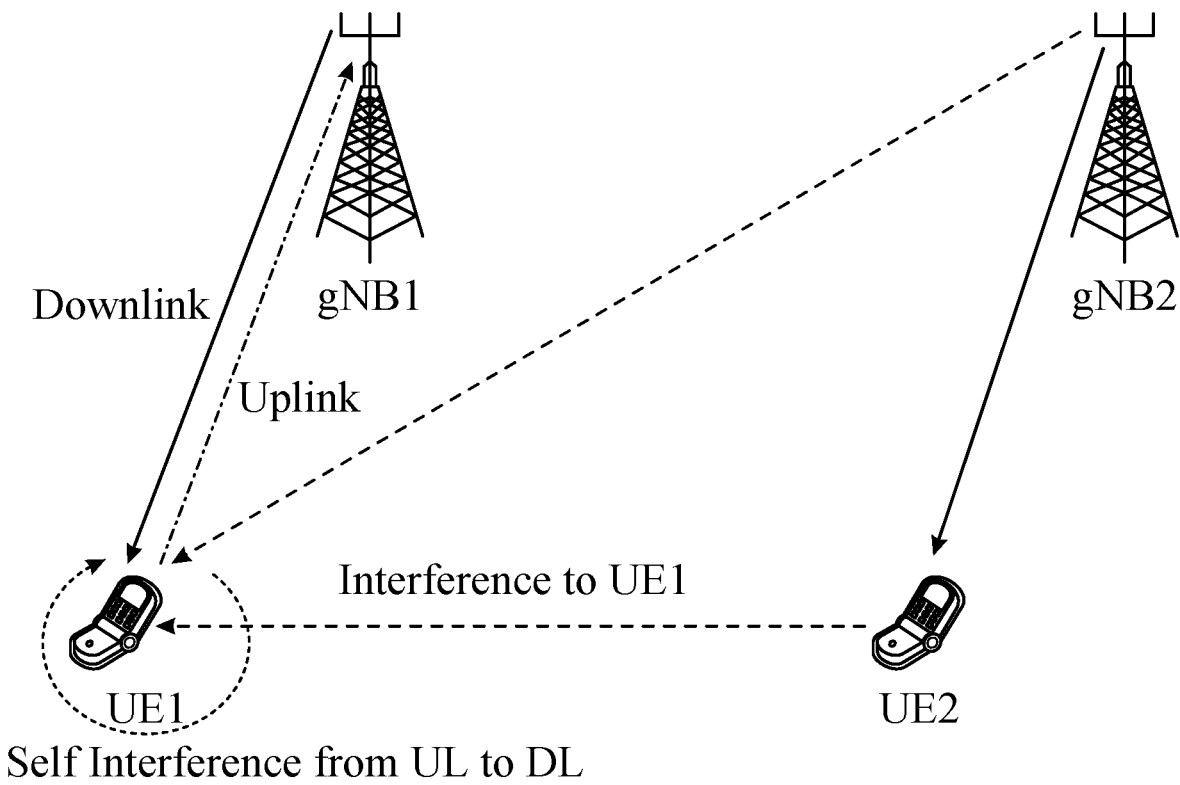

FIG. 4B illustrates another FD communication mode with a FD gNB (e.g., gNB1) and a FD UE (e.g., UE1). In FIG. 4B, the FD gNB and FD UE can communicate simultaneously in UL and DL with each other using the same radio resources. While communicating, the FD UE may be susceptible to self-interference, interference from other gNB(s) (e.g., gNB2), and interference from UE2.

Figure 4C:
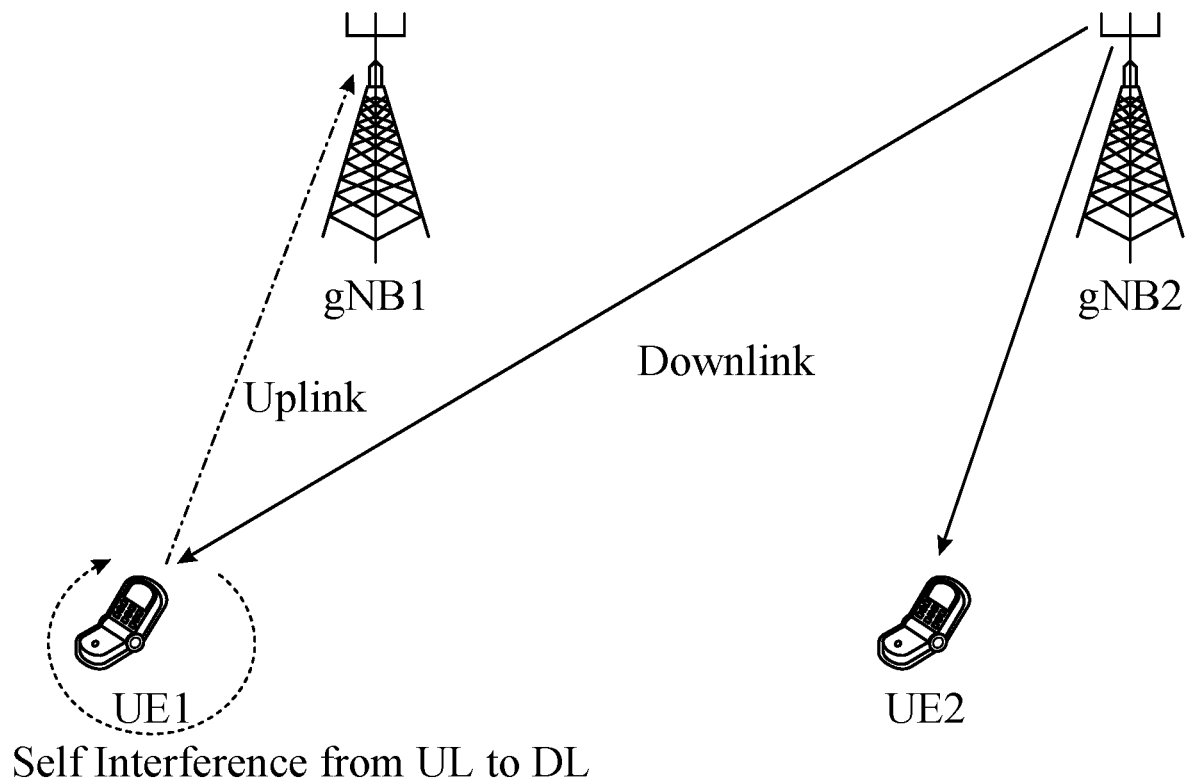

FIG. 4C illustrates yet another FD communication mode with a FD UE only (e.g., UE1). Here, the FD UE can communicate simultaneously in UL and DL with multiple transmission-reception points (e.g., multiple BSs, such as gNB1 and gNB2) using the same radio resources. In this example, the FD UE may be susceptible to self-interference from UL to DL operation.

Figure 5A:
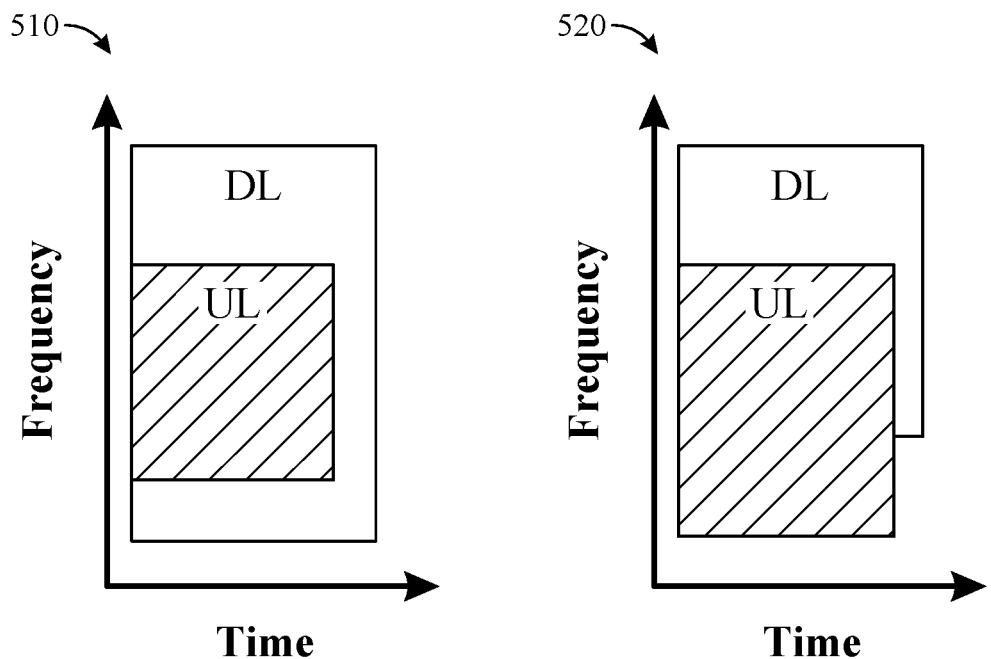
FIGS. 5A & 5B show examples of different types of full duplex operation, in accordance with certain aspects of the present disclosure.

In addition to supporting various FD communication modes (also referred to herein as deployments), the wireless communication system may support various types of FD operation. In-band full duplex (IBFD) depicted in FIG. 5A, for example, is one type of FD operation in which devices can transmit and receive at the same time and on the same frequency resources. As shown in 510 of FIG. 5A, in one aspect, the DL and UL may fully share the same IBFD time/frequency resource (e.g., there may be a full overlap of the DL and UL allocations within the IBFD time/frequency resource). As shown in 520 of FIG. 5A, in one aspect, the DL and UL may partially share the same IBFD time/frequency resource (e.g., there may be a partial overlap of the DL and UL allocations within the IBFD time/frequency resource).

Figure 5B:
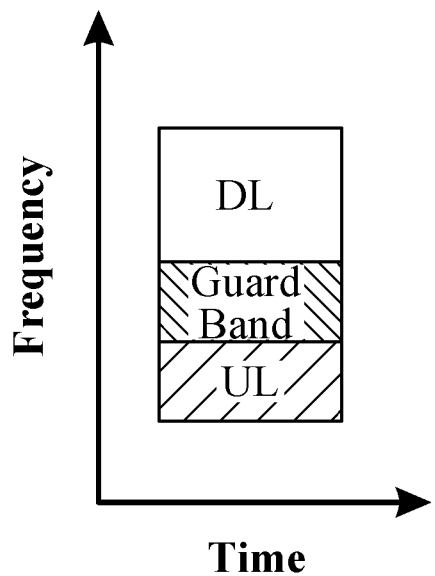

Sub-band full duplex (SBFD) (also referred to as flexible duplex), which is shown in FIG. 5B, is another type of FD operation in which devices can transmit and receive at the same time but on different frequency resources. As shown in FIG. 5B, the DL resource may be separated from the UL resource in the frequency domain by a guard band. This mode of operations reduces the self-interference cancellation requirements on the FD device since the leakage is lower.

Figure 6:
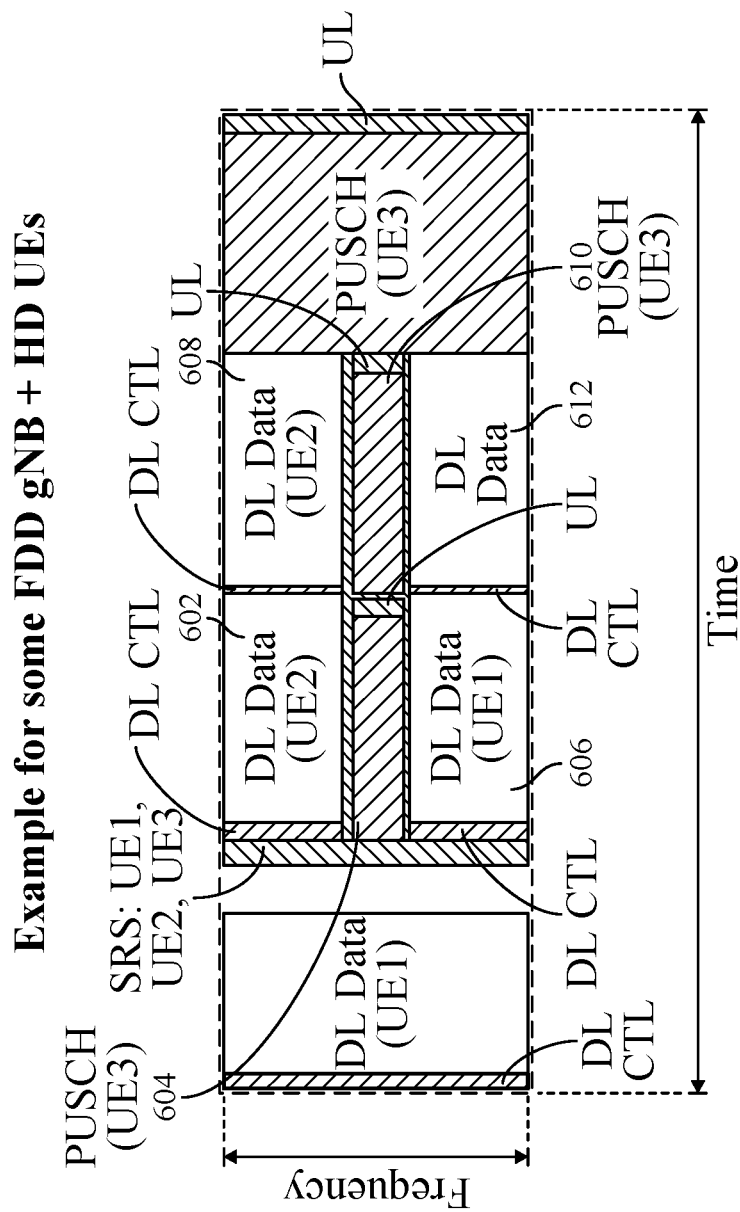
FIG. 6 illustrates an example spectrum for a full duplex base station and half duplex UE, in accordance with certain aspects of the present disclosure.
Figure 6:
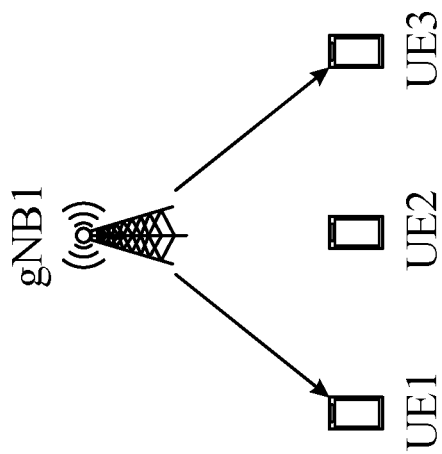

In some aspects, there may be flexible DL/UL operation in time (across and within slots) and across UEs. FIG. 6 illustrates an example use of time/frequency resources (e.g., an example spectrum) for a FD gNB (e.g., gNB1) and HD UEs (e.g., UE1, UE2, and UE3). As shown, there may be simultaneous PDSCH and PUSCH grants for the same subframe/slot (for different UEs). For example, there is a PDSCH grant 602 for UE2, a PUSCH grant 604 for UE3, and a PDSCH grant 606 for UE1 that occur during the same subframe/slot. Additionally, there is a PDSCH grant 608 for UE2, a PUSCH grant 610 for UE3, and a PDSCH grant 612 for UE1 that occur during the same subframe/slot.

Figure 7:
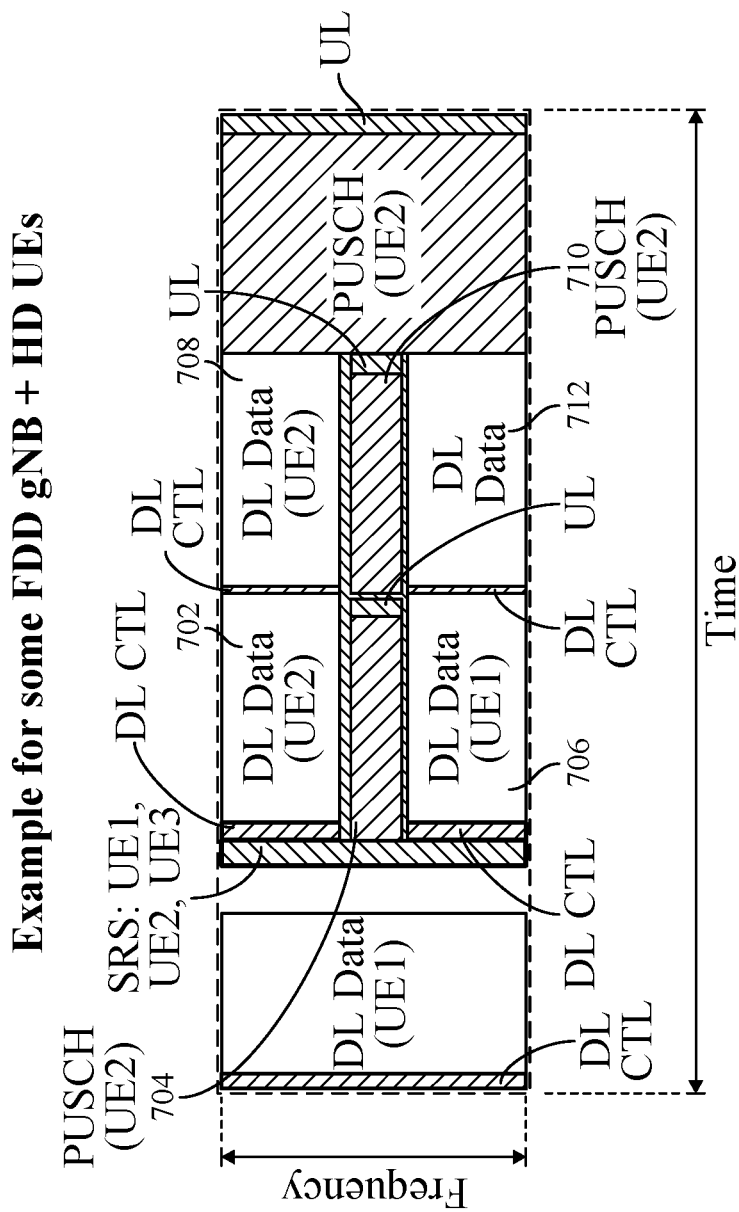
FIG. 7 illustrates an example spectrum for a full duplex base station and a full duplex UE, in accordance with certain aspects of the present disclosure.
Figure 7:
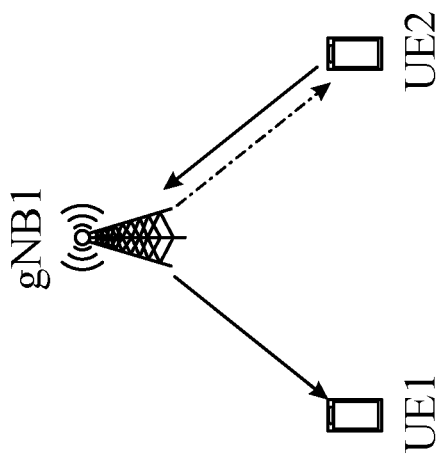

FIG. 7 illustrates another example use of time/frequency resources (e.g., an example spectrum) for a FD gNB (e.g., gNB1) and FD UEs (e.g., UE2). As shown, compared to FIG. 6, there may be simultaneous PDSCH and PUSCH grants for the same subframe/slot for the same UE (e.g., UE2) and/or different UEs. For example, for a FD UE (e.g., UE2) there may be a simultaneous UL and DL grant. Here, in particular, there is (i) a PDSCH grant 702 and a PDSCH grant 704 for the same UE2 and (ii) a PDSCH grant 706 for UE1 in the same subframe/slot. Additionally, there is (i) a PDSCH grant 708 and a PDSCH grant 710 for the same UE2 and (ii) a PDSCH grant 712 for UE1 in the same subframe/slot.

In current communication systems, a switching delay is typically imposed when the UE adapts or changes the operating bandwidth part (BWP). However, for a FD wireless system, the network may have to change the BW (and in addition the UL/DL allocations) from a slot to slot or even within the slot without incurring such a delay. In FIGS. 6 and 7, for example, the UE(s) may have to change the UL transmission (or DL reception) BWP between slots in zero latency. In FIGS. 6 and 7, there may be full reciprocity (e.g., based on the SRS sounding) to cover the entire DL BWP or partial reciprocity (e.g., based on the SRS sounding) to cover part of the DL BWP.

Figure 8:
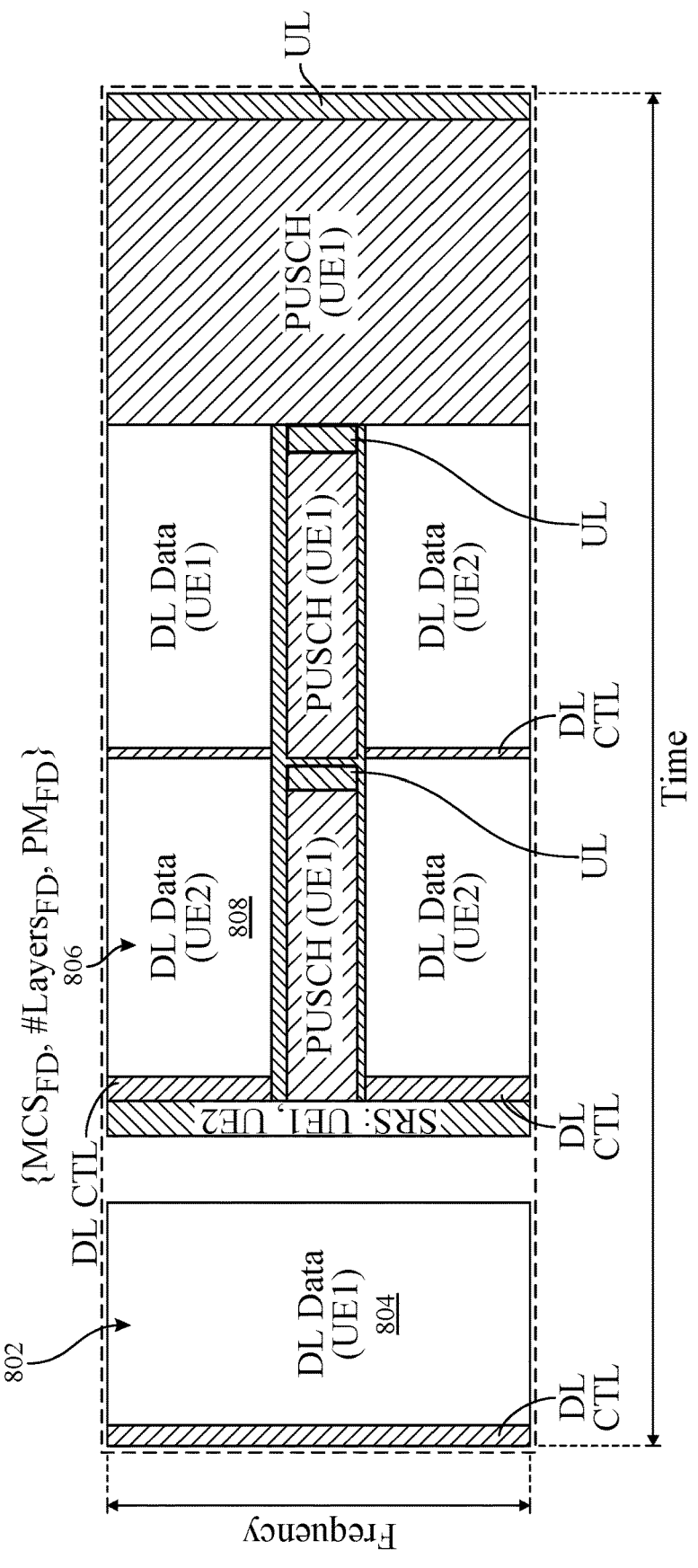
FIG. 8 illustrate an example CSI reporting scenario for a FD UE, in accordance with certain aspects of the present disclosure.

In general, a FD capable UE may report different CSI reports (e.g., channel quality indicator (CQI)/pre-coding matrix indicator (PMI)/rank indicator (RI)) for both HD and FD mode. FIG. 8, for example, shows a scenario in which UE1 reports a first CSI report 802 for HD mode (e.g., for PDSCH grant 804) and UE1 reports a second CSI report 806 for FD mode (e.g., for PDSCH 808). The CSI reports 802 and 806 may be different because of the coexistence of the UL interference (or its residual). The network may differentiate between the DL scheduling at the FD and HD slots based on the CSI reports. This means that the DL scheduling for the HD slot (i.e. modulation coding scheme $(MCS)_{HD}$ $(MCS_{HD})$, #Layers$_{HD}$, precoding matrix $(PM)_{HD}$ $(PM_{HD})$) is different than that of the FD slot (i.e. $MCS_{FD}$, #Layers$_{FD}$, $PM_{FD}$).

Figure 9:
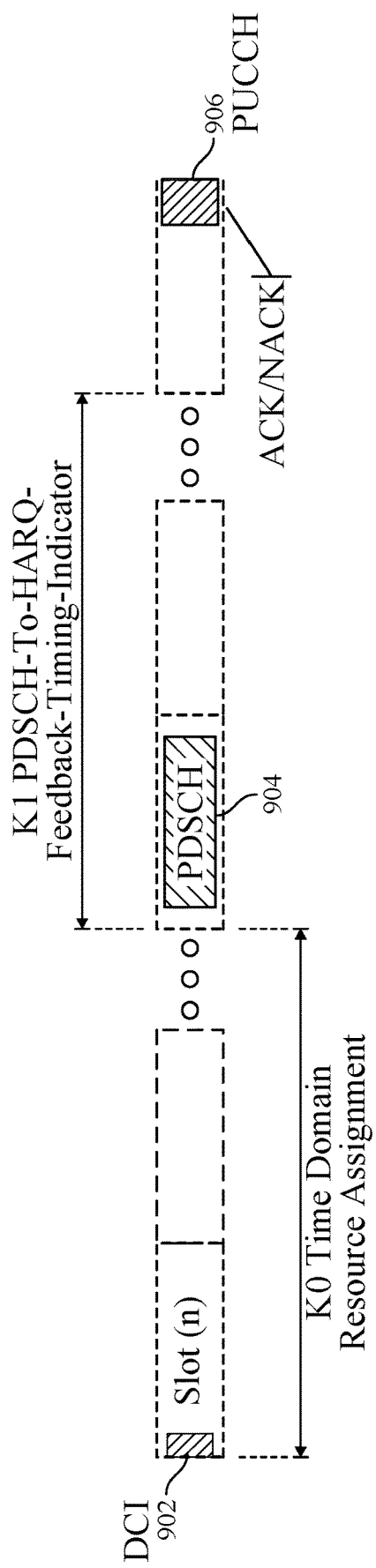
FIG. 9 illustrates an example of HARQ ACK/NACK timing, in accordance with certain aspects of the present disclosure.

Additionally, in current systems, HARQ ACK/NACK timing is generally fully configurable. The HARQ ACK/NACK timing is generally controlled with a feedback timing indicator (k1), e.g., as shown in FIG. 9. Here, for example, the DL DCI 902 may schedule the PDSCH grant 904 and may also include the feedback timing indicator (k1). Based on the feedback timing indicator (k1), the UE can determine when to send HARQ ACK/NACK for the PDSCH grant 904. Here, for example, the UE can determine, based on the feedback timing indicator (k1) to send HARQ ACK/NACK during the PUCCH grant 906.

Figure 10:
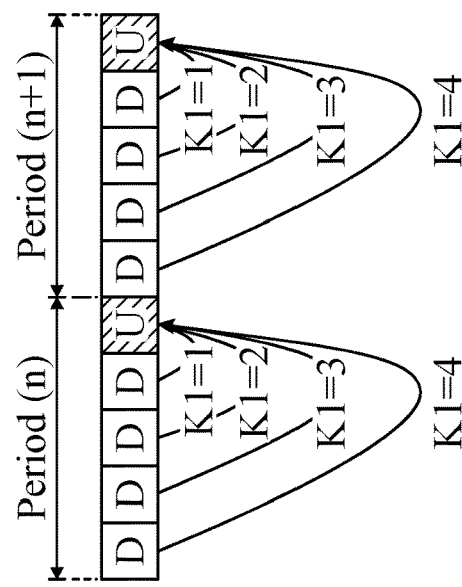
FIG. 10 illustrates an example of indicating a scheduling parameter for HARQ ACK/NACK timing, in accordance with certain aspects of the present disclosure.

Feedback for multiple PDSCH in time can be transmitted in one UL data/control region (e.g., PUCCH 906). This can be achieved by configuring the HARQ ACK/NACK timing for each PDSCH by specifying the parameter k1 in the DL DCI 902. FIG. 10 illustrates one reference example of how the HARQ ACK/NACK timing for each PDSCH can be configured (via the parameter k1) in order to have feedback for multiple PDSCH transmitted in one UL data/control region.

Regarding the HARQ ACK codebook, HARQ-ACK feedback with one bit per TB may be supported. Likewise, a code block group (CBG)-based transmission with single/multi-bit HARQ-ACK feedback may be supported. In some cases, only a CBG-based (re)-transmission may be allowed for the same TB of a HARQ process. A CBG can include all code blocks of a TB regardless of the transport block size (TBS), meaning that a TB may include a single CBG. In this case, the UE can report a single HARQ ACK bit for the TB. In addition, a CBG can include a single code block and CBG granularity can be configurable by higher layers.

Figure 11:
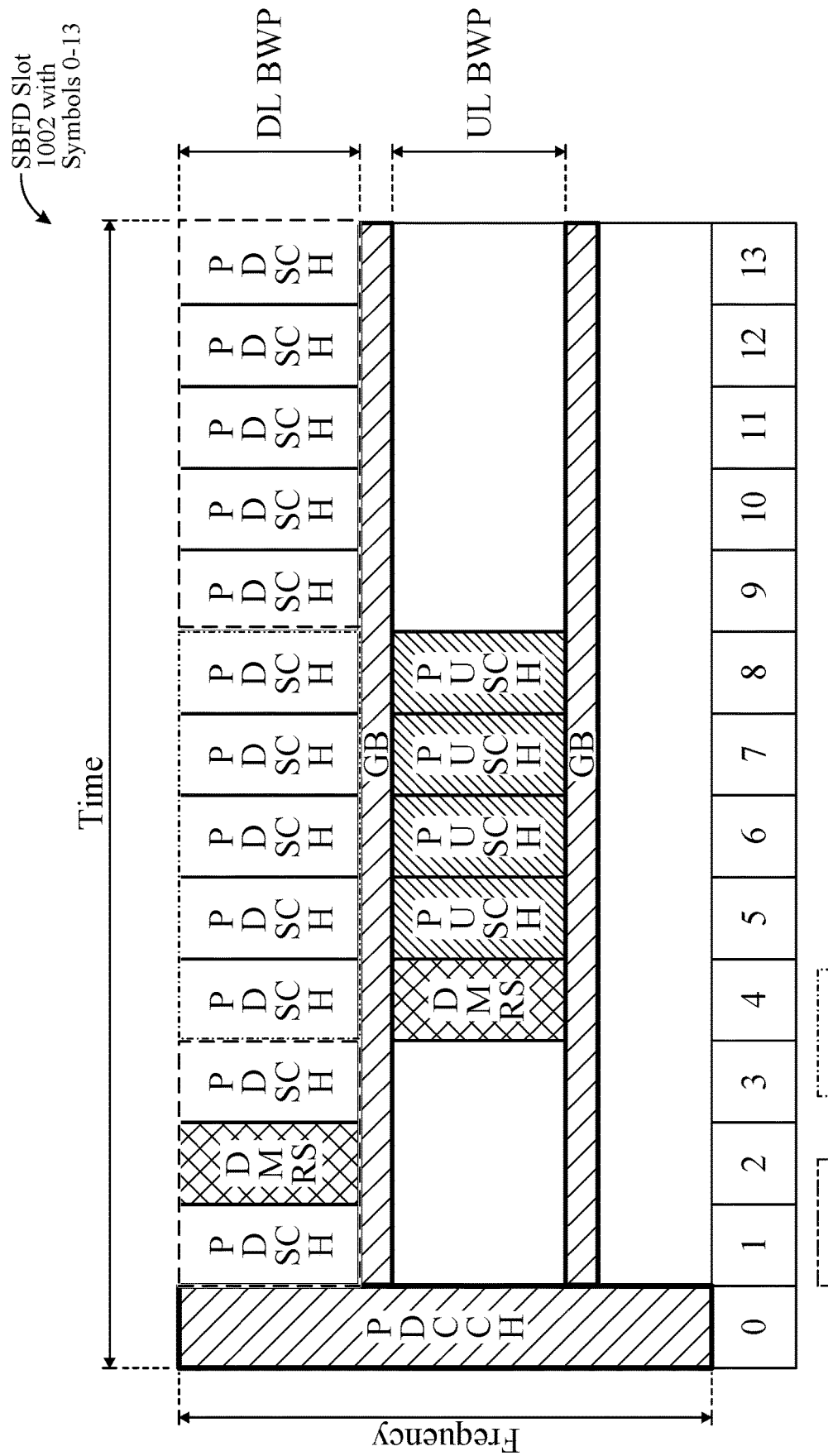
FIG. 11 illustrates a reference scenario of a FD UE operating in a SBFD slot, in accordance with certain aspects of the present disclosure.

In general, a FD UE may operate in a full duplex slot where it transmits UL and receives DL simultaneously. However, based on the actual UL and DL assignment, the simultaneous UL and DL operation may happen for a subset of the symbols within the slot and the UE may operate in HD mode for the remaining subset of symbols. In these cases, the quality of the DL reception in a given symbol may be impacted by the presence of an UL scheduling opportunity in the same symbol. FIG. 11, for example, shows a reference scenario of a FD UE operating in a SBFD slot 1002 (including symbols 0-13), according to certain aspects of the present disclosure. Here, the quality of the DL reception may depend on whether an UL scheduling exists or not in each symbol. For example, FD symbols 4-8 may have a different quality than other HD symbols 1-3 and 9-13. Accordingly, it may be desirable to provide a TB configuration and HARQ ACK protocol to account for FD operation.

Example TB and HARQ ACK/NACK Design for FD UE

Aspects of the present disclosure provide techniques for determining a TB configuration and HARQ ACK design (or configuration or protocol) for FD UEs.

Figure 12:
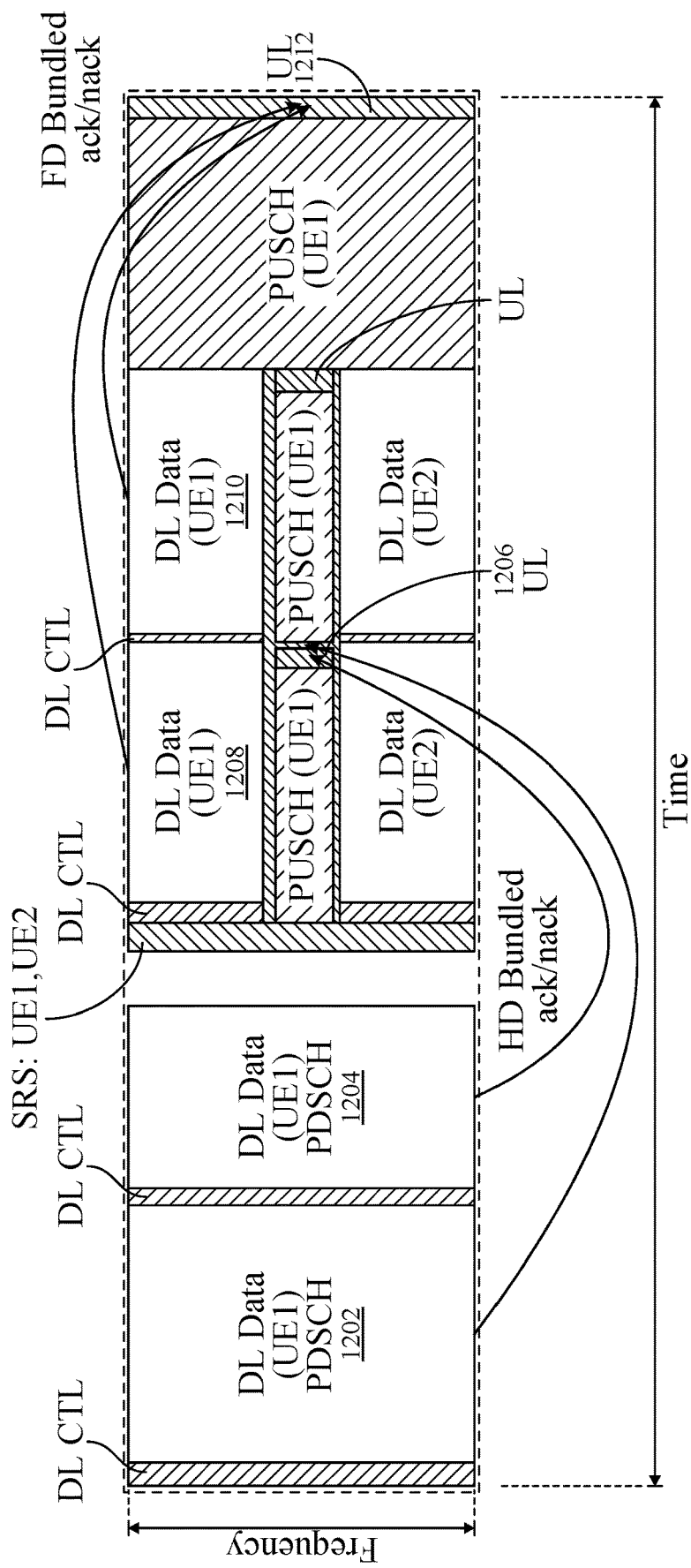
FIG. 12 illustrates a reference example of HD/FD based ACK/NACK bundling, in accordance with certain aspects of the present disclosure.

In some aspects, UEs may be configured to send HARQ feedback based on the particular PDSCH duplexing mode. In one aspect, for example, HARQ ACK/NACK for the FD PDSCH TB(s) (and/or CBG(s)) may be bundled together and feedback in a specific PUCCH/PUSCH. In one aspect, the HARQ ACK/NACK for HD PDSCH transport blocks (TBs) (and/or CBGs) may be bundled together and feedback in a different PUCCH/PUSCH. FIG. 12 illustrates a reference example of HD/FD-based ACK/NACK bundling, in accordance with certain aspects of the present disclosure. As shown, HD bundled ACK/NACK for DL data (e.g., PDSCH 1202 and PDSCH 1204) intended for UE1 is sent in one PUCCH (e.g., UL 1206), and FD bundled ACK/NACK for DL data (e.g., PDSCH 1208 and PDSCH 12010) intended for UE1 is sent in another PUCCH (e.g., UL 1212).

According to certain aspects, a single TB may be used for the TB configuration and a single ACK/NACK may be used as the HARQ ACK protocol. In this aspect, a single TB may be used for both the HD and FD symbols within the slot. The modulation and coding scheme (MCS) and rank that is used for this mixed mode TB may be based on CSI feedback received from the UE(s). In some aspects, an average MCS/rank may be used, e.g., since the quality (MCS/rank) may be different between the HD and FD modes. In some aspects, however, a separate MCS/rank may be used for the single TB.

In certain aspects, the CSI feedback should cover different CQI/RI/PMI measurement scenarios. In one scenario, for example, the CSI feedback can be based on no overlap between the DL and UL symbols (e.g., HD mode). In one reference example, the CSI feedback in this scenario can be based on 12 DL demodulation reference signal (DMRS)/PDSCH symbols and zero UL symbols. In another scenario, the CSI feedback can be based on partial overlap between the DL and UL symbols. In one reference example, the CSI feedback in this scenario can be based on 12 DL DMRS/PDSCH symbols+6 overlapping UL symbols. In yet another scenario, the CSI feedback can be based on full overlap between symbols (e.g., 12 DL symbols+12 overlapping UL symbols).

The network (e.g., gNB) may utilize the above CSI feedback to determine the appropriate MCS and rank for the mixed HD/FD slots and determine the TB size. For the HARQ operation, the UE can use a legacy operation, in which one ACK/NACK for the mixed mode TBs or CBGs based is sent with single or multiple bits. In some aspects, a time/frequency interleaver can be employed to improve the resiliency and increase diversity of the DL transmission of the TB. In some cases, the UE may perform at least some aspects of the CQI measurements in accordance with a standard (e.g., 3GPP TS 38.214 section 5.2.2.1.1 CSI reference resource definition).

Figure 13:
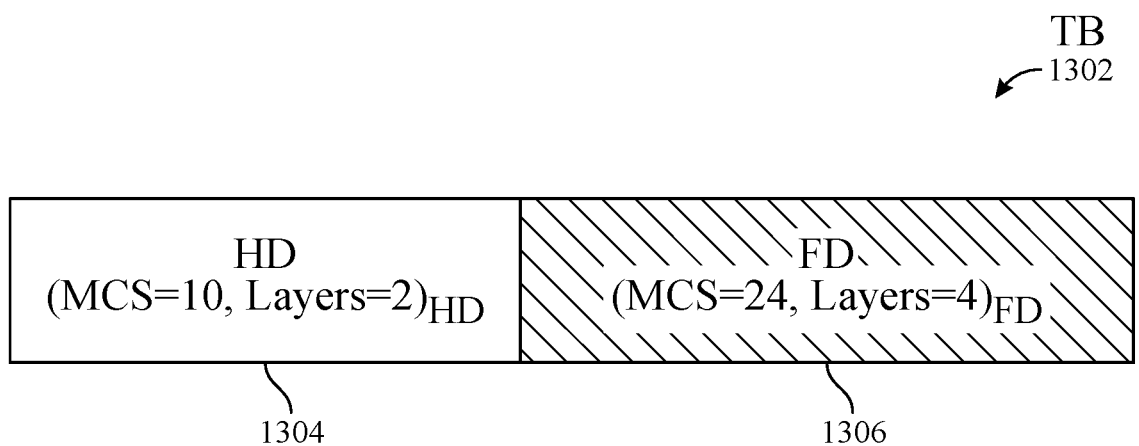
FIG. 13 illustrates an example of a modulation coding scheme/rank scheme for a single TB, in accordance with certain aspects of the present disclosure.

As noted, in aspects where a single TB is used and a single ACK/NACK protocol is implemented, the single TB can assume the same MCS and rank for all the symbols. Alternatively, as shown in FIG. 13, the single TB 1302 can have different MCS and layers corresponding to the HD/FD design. In FIG. 13, for example, the single TB 1302 can use a first MCS (e.g., MCS=10) and first number of layers (e.g., layers=2) for HD symbols 1304 and a second MCS (e.g., MCS=24) and second number of layers (e.g., layers=4) for FD symbols 1306.

Figure 14:
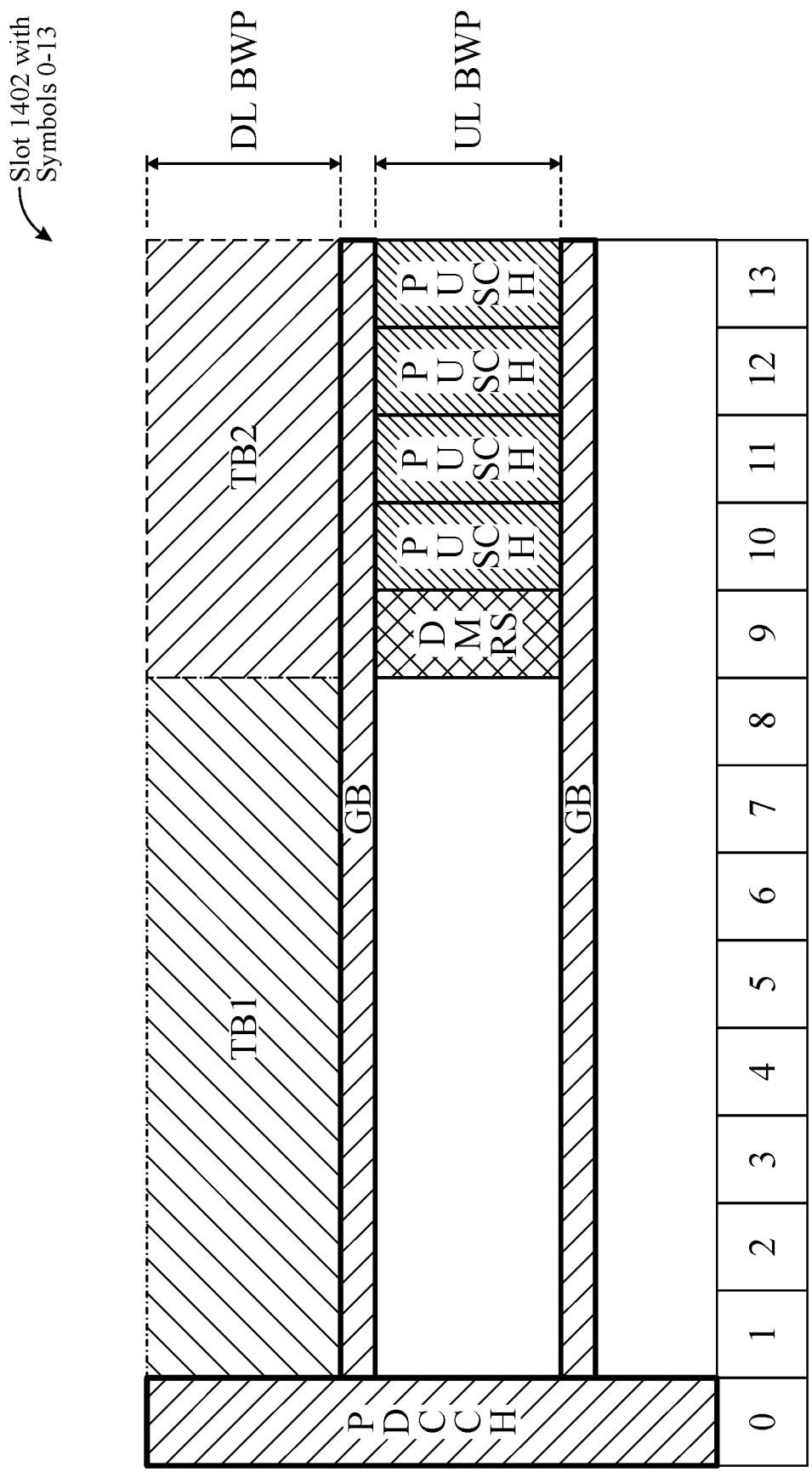
FIG. 14 illustrates an example TB configuration with multiple TBs, in accordance with certain aspects of the present disclosure.

According to certain aspects, multiple TBs may be used for the TB configuration and multiple ACK/NACKs may be used as the HARQ ACK protocol. As shown in FIG. 14, in this aspect, a first TB (e.g., TB1) can be used for the HD symbols and the second TB (e.g., TB2) can be used for the FD symbols within the slot 1402 (with symbols 0-13). The first TB may be based on the CSI reports for the HD mode (e.g., follow the CQI/RI for the HD mode in which there is no overlap) and the second TB may be based on the CSI reports for the FD mode (e.g., follow the CQI/RI for the FD mode in which there may be at least partial overlap). For the HARQ ACK protocol, the ACK/NACK for the HD TB(s) may be bundled and the ACK/NACK for the FD TB(s) may be bundled. The network may re-transmit the TB(s) in either FD mode or HD mode.

In certain aspects, the indication of the TB configuration and HARQ ACK protocol may be signaled to the UE(s) via a (scheduling) downlink control information (DCI). In one aspect, the scheduling DCI may have two indication fields for HD/FD related parameters in addition to one or more common fields. In some cases, to reduce the DCI payload, one or more of the common fields may be merged to achieve lower overhead. The common fields may include a frequency allocation field (FDRA), a BWP indicator, a channel state information reference signal (CSI-RS) trigger, a sounding reference signal (SRS) request, a virtual resource block (VRB) to physical resource block (PRB) (VRB-2-PRB) mapping indicator, a PUCCH resource indicator, and a transmit (or transmission) power control (TPC) command for scheduled PUCCH, secondary cell (SCell) dormancy indication, minimum scheduling offset, etc. The two indication fields for HD/FD TB(s) may include at least one of the following: antenna ports, Transmission configuration indicator (TCI), MCS, new data indicator (NDI), redundancy version (RV), time domain allocation, precoding resource block group (PRG) bundling indicator, HARQ process number, code block group (CBG) transmission information, priority indicator, etc. In some aspects, there may be two DCI indications (e.g., one for HD and one for FD). A single bit can be used in the DCI payload to indicate whether it is for HD mode or FD mode.

Figure 15:
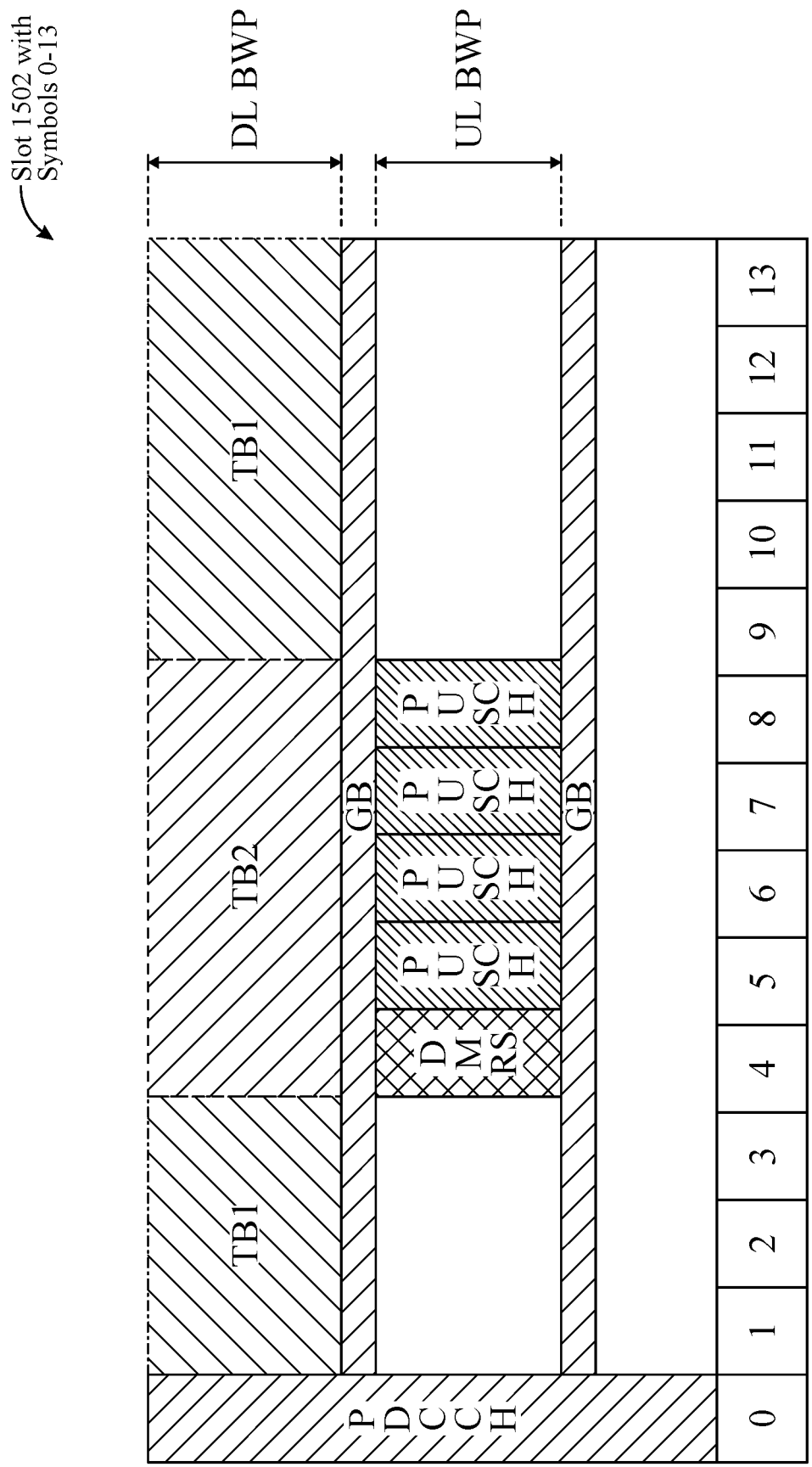
FIG. 15 illustrates an example TB with non-consecutive symbols, in accordance with certain aspects of the present disclosure.

In some aspects, the TB may extend across non-consecutive symbols of a slot (e.g., as shown in FIG. 15). In FIG. 15, for example, TB1 corresponds to symbols 1-3 and symbols 9-13 of slot 1502, while TB2 corresponds to symbols 4-8 of slot 1502. To implement this, time domain resource assignment (TDRA) for TB1 may have to support non-consecutive symbols, which may not be supported by symbol start and length indicator (SLIV) for TDRA. Accordingly, to address this, in one aspect, the non-consecutive TDRA can be realized by a symbol bitmap with each bit indicating whether a symbol is allocated to TB1 or not.

Figure 16:
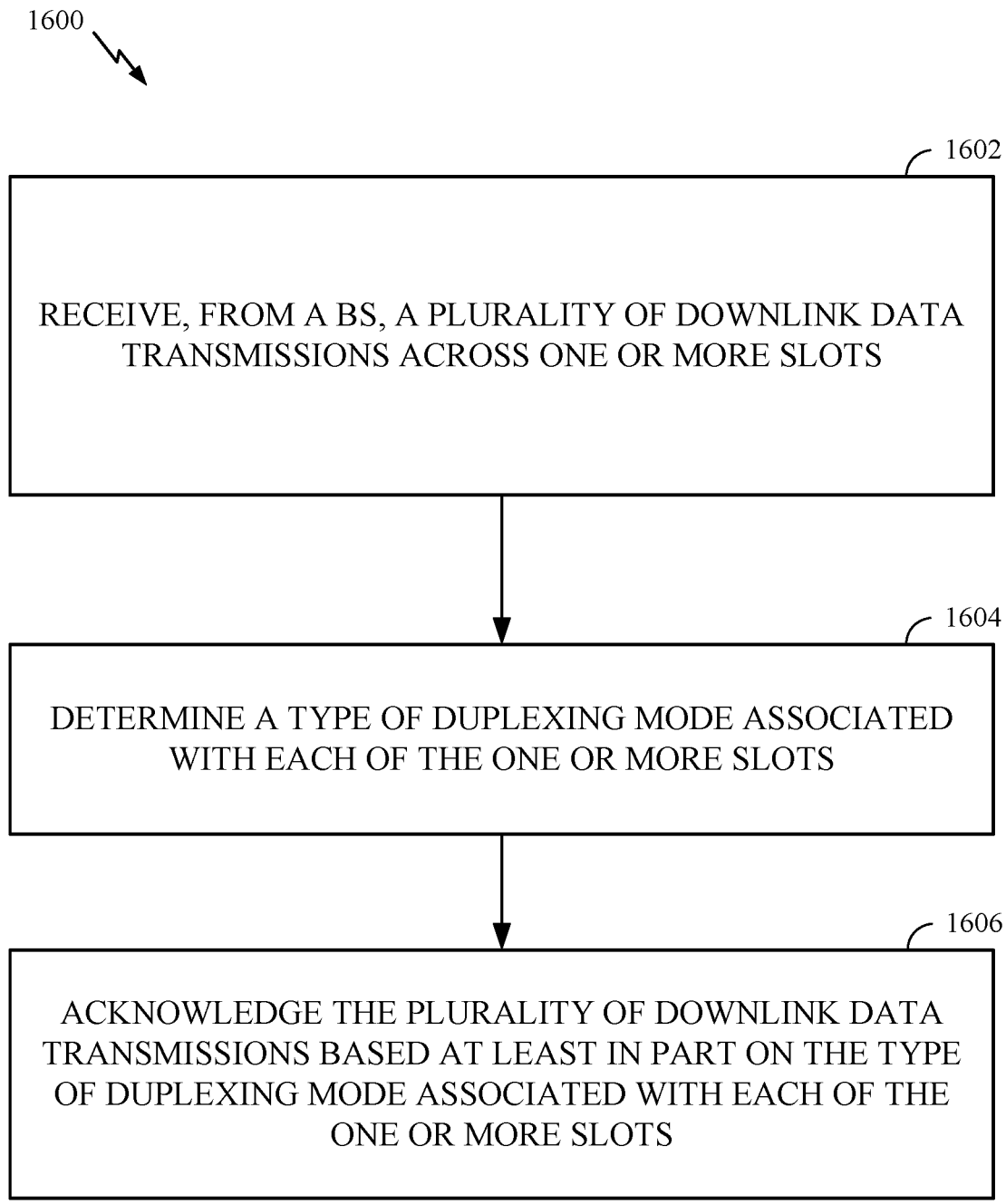
FIG. 16 is a flow diagram illustrating example operations for wireless communication by a UE, in accordance with certain aspects of the present disclosure.

FIG. 16 is a flow diagram illustrating example operations 1600 for wireless communication, in accordance with certain aspects of the present disclosure. The operations 1600 may be performed, for example, by UE (e.g., such as a UE 120 in the wireless communication network 100, shown in FIG. 1). Operations 1600 may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1600 may begin, at block 1602, where the UE receives, from a base station (e.g., BS 110, such as a gNB), a plurality of downlink data transmissions across one or more slots. The plurality of downlink data transmissions may include a plurality of PDSCH TBs.

At block 1604, the UE determines a type of duplexing mode associated with each of the one or more slots. At block 1606, the UE acknowledges the plurality of downlink data transmissions based at least in part on the type of duplexing mode associated with each of the one or more slots.

In one aspect, the plurality of downlink data transmissions may include (i) a first set of PDSCH TBs received across a first set of slots and (ii) a second set of PDSCH TBs received across a second set of slots. In this aspect, the type of duplexing mode associated with the first set of slots may be HD mode and the type of duplexing mode associated with the second set of slots may be a FD mode.

The UE (at block 1606) may acknowledge the plurality of downlink data transmissions by sending a first bundled acknowledgment or negative acknowledgement for the first set of PDSCH TBs in a first uplink channel and sending a second bundled acknowledgment or negative acknowledgement for the second set of PDSCH TBs in a second uplink channel.

Figure 17:
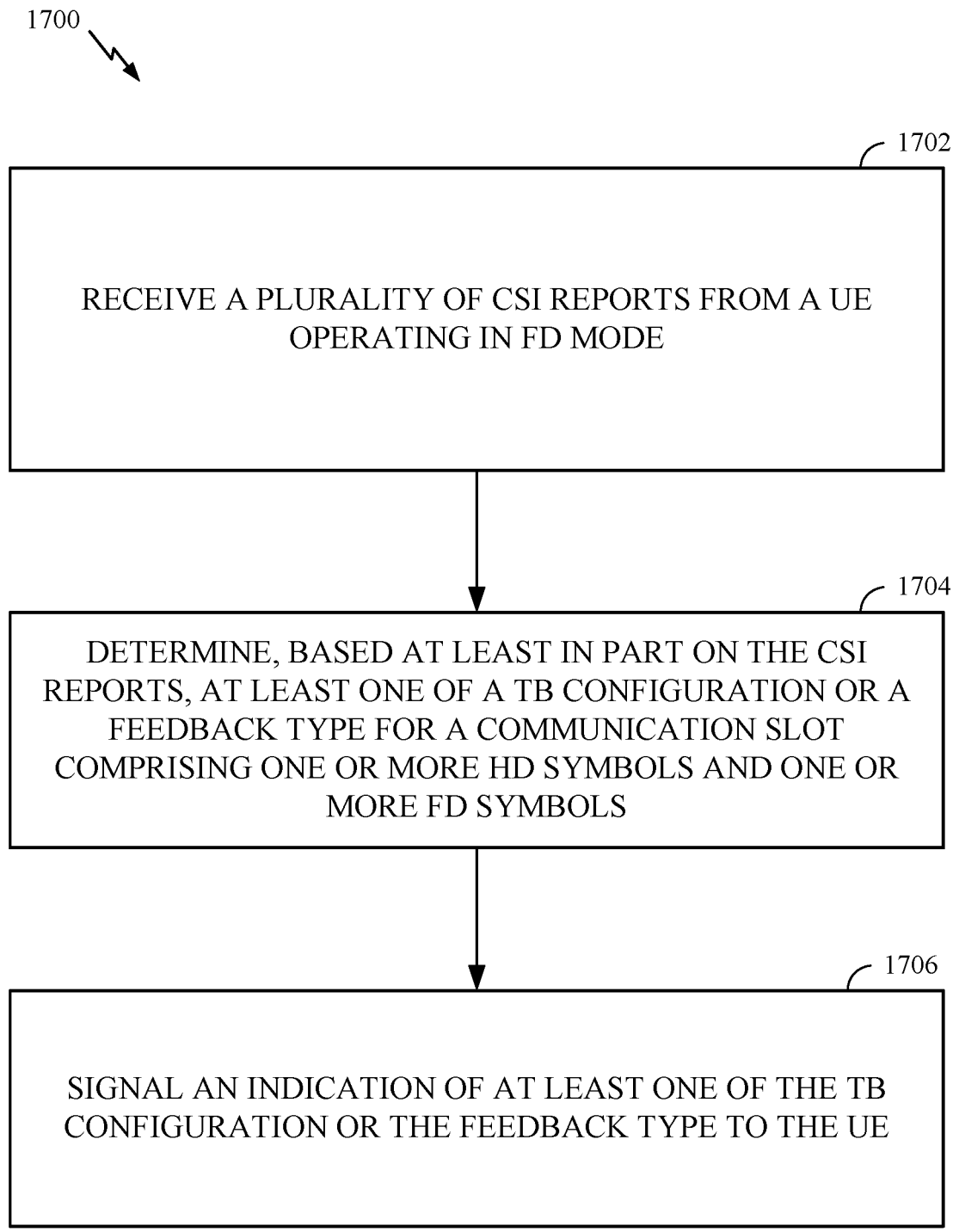
FIG. 17 is a flow diagram illustrating example operations for wireless communication by a BS, in accordance with certain aspects of the present disclosure.

FIG. 17 is a flow diagram illustrating example operations 1700 for wireless communication, in accordance with certain aspects of the present disclosure. The operations 1700 may be performed, for example, by a BS (e.g., such as a BS 110 in the wireless communication network 100, shown in FIG. 1). Operations 1700 may be implemented as software components that are executed and run on one or more processors (e.g., controller/processor 240 of FIG. 2). Further, the transmission and reception of signals by the BS in operations 1700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1700 may begin, at block 1702, where the BS receives a plurality of channel state information (CSI) reports from a user equipment (UE) operating in full duplex (FD) mode. At block 1704, the BS determines, based at least in part on the plurality of CSI reports, at least one of a transport block (TB) configuration or a feedback type for a communication slot comprising one or more half duplex (HD) symbols and one or more FD symbols. In some aspects, the one or more HD symbols may be non-consecutive and the one or more FD symbols may be consecutive, or vice versa. At block 1706, the BS signals an indication of at least one of the TB configuration or the feedback type to the UE.

In some aspects, the plurality of CSI reports may include at least a first CSI report for one or more HD symbols and a second CSI report for one or more FD symbols. In one aspect, the first CSI report may be based on measurements for a set of downlink symbols. In one aspect, the second CSI report may be based on measurements for a set of downlink symbols and a set of uplink symbols, where the set of downlink symbols partially overlap the set of uplink symbols. In one aspect, the second CSI report may be based on measurements for a set of downlink symbols and a set of uplink symbols, where the set of downlink symbols fully overlap the set of uplink symbols.

In some aspects, the BS may determine at least one of a MCS and rank for the communication slot, based on the CSI reports. In some aspects, the TB configuration may include a number of TBs for the slot and the feedback type may include a single acknowledgment mode or multiple acknowledgment mode. In one aspect, a single TB may be used for the one or more HD symbols and the one or more FD symbols, and the feedback type may include a single acknowledgment mode. In this aspect, the single TB may use the same MCS and rank for each symbol or may use a first MCS and rank for the HD symbol(s) and a second MCS and rank for the FD symbol(s).

In one aspect, multiple TBs may be used for the HD symbol(s) and FD symbol(s) and the feedback type may include a multiple acknowledgment mode. In this aspect, a first TB may be used for the HD symbol(s) and a second TB may be used for the FD symbol(s). The first TB may use a MCS and rank based on the CSI reports for the HD symbols and the second TB may use a MCS and rank based on the CSI reports for the FD symbols.

Figure 18:
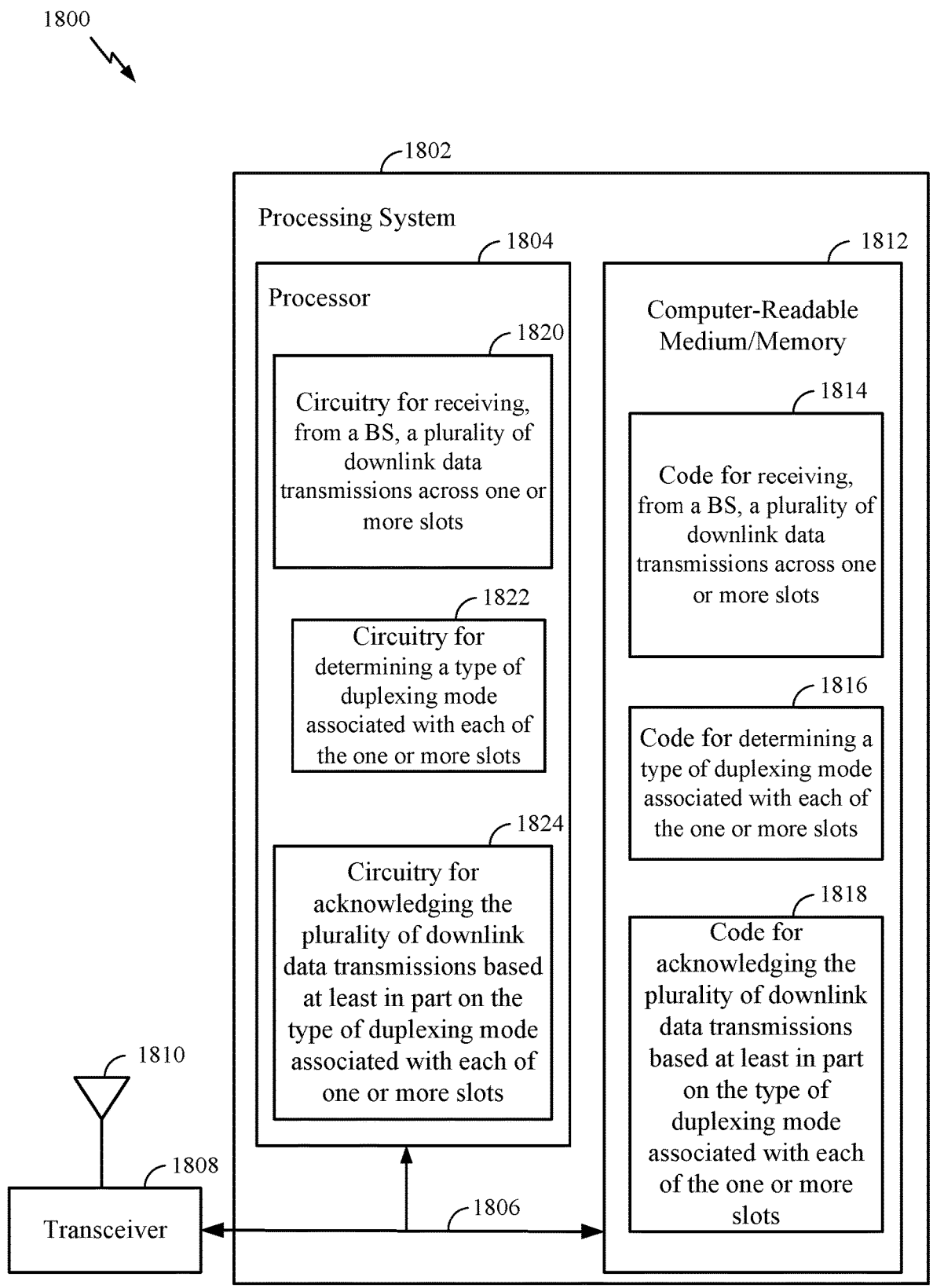
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIG. 16. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIG. 16, or other operations for performing the various techniques discussed herein. In certain aspects, computer-readable medium/memory 1812 stores code 1814 for receiving, from a base station, a plurality of downlink data transmissions across one or more slots, code 1816 for determining a type of duplexing mode associated with each of the one or more slots, and code 1818 for acknowledging the plurality of downlink data transmissions based at least in part on the type of duplexing mode associated with each of the one or more slots.

In certain aspects, the processor 1804 has circuitry configured to implement the code stored in the computer-readable medium/memory 1812. The processor 1804 includes circuitry 1820 for receiving, from a base station, a plurality of downlink data transmissions across one or more slots, circuitry 1822 for determining a type of duplexing mode associated with each of the one or more slots, and circuitry 1824 for acknowledging the plurality of downlink data transmissions based at least in part on the type of duplexing mode associated with each of the one or more slots.

Figure 19:
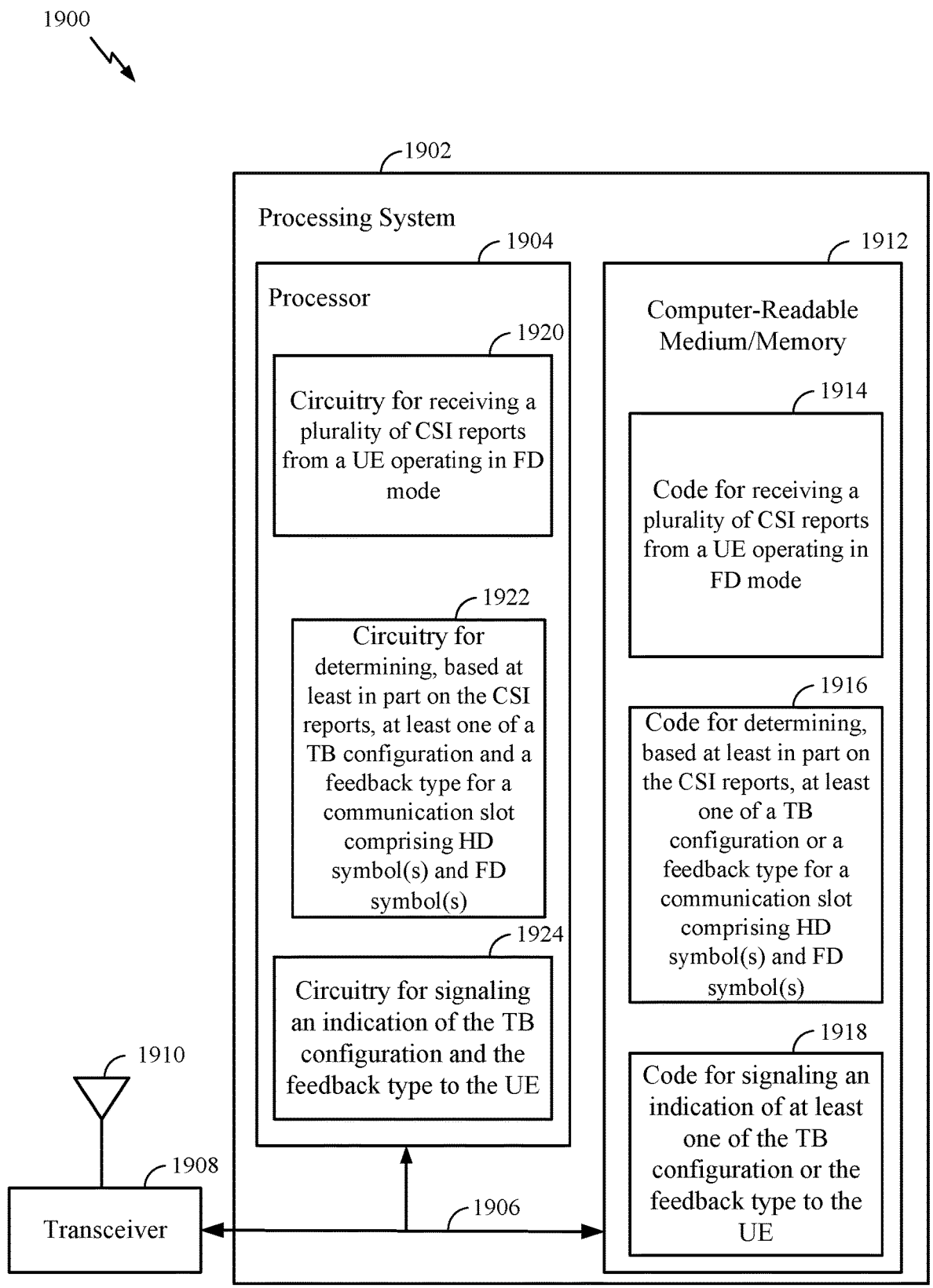
FIG. 19 illustrates a communications device that may include various components configured to perform operations for the techniques disclosed herein in accordance with aspects of the present disclosure.

FIG. 19 illustrates a communications device 1900 that may include various components (e.g., corresponding to means-plus-function components) configured to perform operations for the techniques disclosed herein, such as the operations illustrated in FIG. 17. The communications device 1900 includes a processing system 1902 coupled to a transceiver 1908. The transceiver 1908 is configured to transmit and receive signals for the communications device 1900 via an antenna 1910, such as the various signals as described herein. The processing system 1902 may be configured to perform processing functions for the communications device 1900, including processing signals received and/or to be transmitted by the communications device 1900.

The processing system 1902 includes a processor 1904 coupled to a computer-readable medium/memory 1912 via a bus 1906. In certain aspects, the computer-readable medium/memory 1912 is configured to store instructions (e.g., computer-executable code) that when executed by the processor 1904, cause the processor 1904 to perform the operations illustrated in FIG. 17, or other operations for performing the various techniques discussed herein. In certain aspects, computer-readable medium/memory 1912 stores code 1914 for receiving a plurality of CSI reports from a UE operating in FD mode, code 1916 for determining, based at least in part on the plurality of CSI reports, at least one of a TB configuration or a feedback type for a communication slot comprising one or more HD symbols and one or more FD symbols, and code 1918 for signaling an indication of at least one of the TB configuration or the feedback type to the UE. In certain aspects, the processor 1904 has circuitry configured to implement the code stored in the computer-readable medium/memory 1912. The processor 1904 includes circuitry 1920 for receiving a plurality of CSI reports from a UE operating in FD mode, circuitry 1922 for determining, based at least in part on the plurality of CSI reports, at least one of a TB configuration or a feedback type for a communication slot comprising one or more HD symbols and one or more FD symbols, and circuitry 1924 for signaling an indication of at least one of the TB configuration or the feedback type to the UE.

Example Aspects

Implementation examples are described in the following numbered clauses:

1. A method for wireless communication by a UE, comprising: receiving, from a BS, a plurality of downlink data transmissions across a plurality of slots; determining a type of duplexing mode associated with each of the plurality of slots; and acknowledging the plurality of downlink data transmissions based at least in part on the type of duplexing mode associated with each of the plurality of slots.

2. The method of Aspect 1, wherein the plurality of downlink data transmissions comprise a plurality of physical downlink shared channel (PDSCH) transport blocks (TBs).

3. The method of any of Aspects 1-2, wherein the plurality of downlink data transmissions comprise (i) a first set of PDSCH TBs received across a first set of slots and (ii) a second set of PDSCH TBs received across a second set of slots.

4. The method of any of Aspects 1-3, wherein: the type of duplexing mode associated with the first set of slots is a half-duplexing mode; and the type of duplexing mode associated with the second set of slots is a full duplexing mode.

5. The method of any of Aspects 1-4, wherein acknowledging the plurality of downlink data transmissions comprises: sending a first bundled acknowledgment or negative acknowledgement for the first set of PDSCH TBs in a first uplink channel; and sending a second bundled acknowledgment or negative acknowledgement for the second set of PDSCH TBs in a second uplink channel.

6. A method for wireless communication by a base station (BS), comprising: receiving a plurality of channel state information (CSI) reports from a user equipment (UE) operating in full duplex (FD) mode; determining, based at least in part on the plurality of CSI reports, at least one of a transport block (TB) configuration or a feedback type for a communication slot comprising one or more half duplex (HD) symbols and one or more FD symbols; and signaling an indication of at least one of the TB configuration or the feedback type to the UE.

7. The method of Aspect 6, wherein the plurality of CSI reports comprises at least a first CSI report for one or more HD symbols and a second CSI report for one or more FD symbols.

8. The method of Aspect 7, wherein the first CSI report is based on measurements for a set of downlink symbols.

9. The method of Aspect 7, wherein: the second CSI report is based on measurements for a set of downlink symbols and a set of uplink symbols; and the set of downlink symbols partially overlap the set of uplink symbols.

10. The method of Aspect 7, wherein: the second CSI report is based on measurements for a set of downlink symbols and a set of uplink symbols; and the set of downlink symbols fully overlap the set of uplink symbols.

11. The method of any of Aspects 1-10, further comprising determining at least one of a modulation coding scheme (MCS), the rank and the DL precoder for the communication slot, based on the CSI reports.

12. The method of any of Aspects 1-11, wherein: the TB configuration comprises a number of TBs for the slot; and the feedback type comprises a single acknowledgment mode or multiple acknowledgment mode.

13. The method of any of Aspects 1-12, wherein: a single TB is used for the one or more HD symbols and the one or more FD symbols; and the feedback type comprises a single acknowledgement mode.

14. The method of any of Aspects 1-13, wherein the single TB uses a same modulation and coding scheme (MCS) and rank for each HD symbol and FD symbol.

15. The method of any of Aspects 1-13, wherein the single TB uses a first modulation and coding scheme (MCS) and rank for the one or more HD symbols and a second MCS and rank for the one or more FD symbols.

16. The method of any of Aspects 1-12, wherein: a plurality of TBs are used for the one or more HD symbols and the one or more FD symbols; and the feedback type comprises a multiple acknowledgement mode.

17. The method of any of Aspects 1-16, wherein a first TB is used for the one or more HD symbols and a second TB is used for the one or more FD symbols.

18. The method of Aspect 17, wherein: the first TB uses a modulation and coding scheme (MCS) and rank based on the CSI report for the one or more HD symbols; and the second TB uses a MCS and rank based on the CSI report for the one or more FD symbols.

19. The method of Aspect 17, wherein the one or more HD symbols are non-consecutive and the one or more FD symbols are consecutive.

20. The method of any of Aspects 1-20, wherein the indication is signaled via at least one downlink control information (DCI).

21. The method of Aspect 20, wherein the at least one DCI comprises one or more common fields and two indication fields for the HD symbols and the FD symbols.

22. The method of Aspect 20, wherein the at least one DCI comprises a first DCI for the HD symbols and a second DCI for the FD symbols.

23. The method of Aspect 17, wherein the first TB and the second TB are scheduled by a same scheduling DCI.

24. A method for wireless communication by a UE, comprising: receiving, from a BS, a plurality of downlink data transmissions across one or more slots; determining a type of duplexing mode associated with each of the one or more slots; and acknowledging the plurality of downlink data transmissions based at least in part on the type of duplexing mode associated with each of the one or more slots.

25. The method of Aspect 24, wherein the plurality of downlink data transmissions comprise a plurality of PDSCH TBs.

26. The method of any of Aspects 24-25, wherein: the one or more slots comprise a plurality of slots; and the plurality of downlink data transmissions comprise (i) a first set of PDSCH TBs received across a first set of the plurality of slots and (ii) a second set of PDSCH TBs received across a second set of the plurality of slots.

27. The method of Aspect 26, wherein: the type of duplexing mode associated with the first set of the plurality of slots is a half-duplexing mode; and the type of duplexing mode associated with the second set of the plurality of slots is a full duplexing mode.

28. The method of any of Aspects 26-27, wherein acknowledging the plurality of downlink data transmissions comprises: sending a first bundled acknowledgment or negative acknowledgement for the first set of PDSCH TBs in a first uplink channel; and sending a second bundled acknowledgment or negative acknowledgement for the second set of PDSCH TBs in a second uplink channel.

29. The method of any of Aspects 24-28, wherein the plurality of downlink data transmissions comprise (i) a first PDSCH TB received across a first set of symbols within one slot of the one or more slots and (ii) a second PDSCH TB received across a second set of symbols within the one slot of the one or more slots.

30. The method of Aspect 29, wherein the type of duplexing mode associated with the first set of symbols is a half-duplexing mode; and the type of duplexing mode associated with the second set of symbols is a full duplexing mode.

31. The method of any of Aspects 29-30, wherein acknowledging the plurality of downlink data transmissions comprises sending a bundled acknowledgement or negative acknowledgment for the first PDSCH TB and the second PDSCH TB in a single uplink channel.

32. An apparatus comprising at least one processor and a memory coupled to the at least one processor, the at least one processor being configured to perform any of the methods of Aspects 1-5 and 24-31.

33. An apparatus comprising at least one processor and a memory coupled to the at least one processor, the at least one processor being configured to perform any of the methods of Aspects 6-23.

34. An apparatus comprising means for performing any of the methods of Aspects 1-5 and 24-31.

35. An apparatus comprising means for performing any of the methods of Aspects 6-23.

36. A computer-readable storage medium having computer executable code stored thereon, which when executed by one or more processors, perform any of the methods of Aspects 1-5 and 24-31.

37. A computer-readable storage medium having computer executable code stored thereon, which when executed by one or more processors, perform any of the methods of Aspects 6-23.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 16-17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   receiving, from a base station (BS), a plurality of physical downlink shared channel PDSCH) transport blocks (TBs) across one or more slots;
   determining a type of duplexing mode associated with each of the one or more slots; and
   acknowledging the plurality of PDSCH TBs based at least in part on the type of duplexing mode associated with each of the one or more slots, the plurality of PDSCH TBs comprising (i) a first PDSCH TB received across a first set of symbols within one slot of the one or more slots, the first set of symbols being associated with a half-duplexing mode and (ii) a second PDSCH TB received across a second set of symbols within the one slot of the one or more slots, the second set of symbols being associated with a full duplexing mode.

2. The method of claim 1, wherein acknowledging the plurality of PDSCH TBs comprises sending a bundled acknowledgement or negative acknowledgment for the first PDSCH TB and the second PDSCH TB in a single uplink channel.

3. The method of claim 1, wherein:
   the one or more slots comprise a plurality of slots; and
   the plurality of PDSCH TBs comprises (i) a first set of PDSCH TBs received across a first set of the plurality of slots and (ii) a second set of PDSCH TBs received across a second set of the plurality of slots.

4. The method of claim 3, wherein:
   the type of duplexing mode associated with the first set of the plurality of slots is the half-duplexing mode; and
   the type of duplexing mode associated with the second set of the plurality of slots is the full duplexing mode.

5. The method of claim 4, wherein acknowledging the plurality of PDSCH TBs comprises:
   sending a first bundled acknowledgment or negative acknowledgement for the first set of PDSCH TBs in a first uplink channel; and
   sending a second bundled acknowledgment or negative acknowledgement for the second set of PDSCH TBs in a second uplink channel.

6. An apparatus for wireless communications comprising:
   one or more memories collectively storing executable instructions; and one or more processors coupled to the one or more memories, the one or more processors being collectively configured to execute the executable instructions to cause the apparatus to:

receive a plurality of channel state information (CSI) reports from a user equipment (UE) operating in full duplex (FD) mode;

determine, based at least in part on the plurality of CSI reports, at least one of a transport block (TB) configuration or a feedback type for a communication slot comprising one or more half duplex (HD) symbols and one or more FD symbols, wherein the plurality of CSI reports comprises at least a first CSI report for one or more HD symbols and a second CSI report for one or more FD symbols; and transmit an indication of the TB configuration and the feedback type to the UE.

7. The apparatus of claim 6, wherein the first CSI report is based on measurements for a set of downlink symbols.

8. The apparatus of claim 6, wherein:
the second CSI report is based on measurements for a set of downlink symbols and a set of uplink symbols; and
the set of downlink symbols partially overlap the set of uplink symbols.

9. An apparatus for wireless communication comprising:
one or more memories collectively storing executable instructions; and
one or more processors coupled to the one or more memories, the one or more processors being collectively configured to execute the executable instructions to cause the apparatus to:
receive, from a base station (BS), a plurality of physical downlink shared channel (PDSCH) transport blocks (TBs) across one or more slots;
determine a type of duplexing mode associated with each of the one or more slots; and
acknowledge the plurality of PDSCH TBs based at least in part on the type of duplexing mode associated with each of the one or more slots, the plurality of PDSCH TBs comprising (i) a first PDSCH TB received across a first set of symbols within one slot of the one or more slots, the first set of symbols being associated with a half-duplexing mode and (ii) a second PDSCH TB received across a second set of symbols within the one slot of the one or more slots, the second set of symbols being associated with a full duplexing mode.

10. The apparatus of claim 9, wherein:
the one or more slots comprise a plurality of slots; and
the plurality of PDSCH TBs comprises (i) a first set of PDSCH TBs received across a first set of the plurality of slots and (ii) a second set of PDSCH TBs received across a second set of the plurality of slots.

11. The apparatus of claim 10, wherein:
the type of duplexing mode associated with the first set of the plurality of slots is the half-duplexing mode; and
the type of duplexing mode associated with the second set of the plurality of slots is the full duplexing mode.

12. The apparatus of claim 11, wherein to acknowledge the plurality of PDSCH TBs, the one or more processors are collectively configured to execute the executable instructions to cause the apparatus to:
send a first bundled acknowledgment or negative acknowledgement for the first set of PDSCH TBs in a first uplink channel; and
send a second bundled acknowledgment or negative acknowledgement for the second set of PDSCH TBs in a second uplink channel.

13. The apparatus of claim 9, wherein to acknowledge the plurality of PDSCH TBs, the one or more processors are collectively configured to execute the executable instructions to cause the apparatus to send a bundled acknowledgement or negative acknowledgment for the first PDSCH TB and the second PDSCH TB in a single uplink channel.

14. A method for wireless communication by a base station (BS), comprising:
receiving a plurality of channel state information (CSI) reports from a user equipment (UE) operating in full duplex (FD) mode;
determining, based at least in part on the plurality of CSI reports, at least one of a transport block (TB) configuration or a feedback type for a communication slot comprising one or more half duplex (HD) symbols and one or more FD symbols, wherein the plurality of CSI reports comprises at least a first CSI report for one or more HD symbols and a second CSI report for one or more FD symbols; and
signaling an indication of the TB configuration and the feedback type to the UE.

15. The method of claim 14, wherein:
the second CSI report is based on measurements for a set of downlink symbols and a set of uplink symbols; and
the set of downlink symbols partially overlap the set of uplink symbols.

16. The method of claim 14, wherein:
the second CSI report is based on measurements for a set of downlink symbols and a set of uplink symbols; and
the set of downlink symbols fully overlap the set of uplink symbols.

17. The method of claim 14, further comprising determining at least one of a modulation coding scheme (MCS), a rank, or a downlink (DL) precoder for the communication slot, based on the plurality of CSI reports.

18. The method of claim 14, wherein:
the TB configuration comprises a number of TBs for the communication slot; and
the feedback type comprises a single acknowledgment mode or multiple acknowledgment mode.

19. The method of claim 18, wherein:
a single TB is used for the one or more HD symbols and the one or more FD symbols; and
the feedback type comprises a single acknowledgement mode.

20. The method of claim 19, wherein the single TB uses a same modulation and coding scheme (MCS) and rank for each HD symbol and FD symbol.

21. The method of claim 19, wherein the single TB uses a first modulation and coding scheme (MCS) and rank for the one or more HDD symbols and a second MCS and rank for the one or more FD symbols.

22. The method of claim 18, wherein:
a plurality of TBs are used for the one or more HD symbols and the one or more FD symbols; and
the feedback type comprises a multiple acknowledgement mode.

23. The method of claim 22, wherein a first TB is used for the one or more HD symbols and a second TB is used for the one or more FD symbols.

24. The method of claim 23, wherein the first TB and the second TB are scheduled by a same scheduling downlink control information (DCI).

25. The method of claim 23, wherein:
the first TB uses a modulation and coding scheme (MCS) and rank based on a CSI report for the one or more HD symbols; and
the second TB uses a MCS and rank based on the CSI report for the one or more FD symbols.

26. The method of claim 23, wherein the one or more HD symbols are non-consecutive and the one or more FD symbols are consecutive.

27. The method of claim 14, wherein the indication is signaled via at least one downlink control information (DCI).

28. The method of claim 27, wherein the at least one DCI comprises one or more common fields and two indication fields for the HD symbols and the FD symbols.

29. The method of claim 27, wherein the at least one DCI comprises a first DCI for the HD symbols and a second DCI for the FD symbols.

30. The method of claim 14, wherein the first CSI report is based on measurements for a set of downlink symbols.

\* \* \* \* \*